US010072159B2

(12) United States Patent
Diehl et al.

(10) Patent No.: US 10,072,159 B2
(45) Date of Patent: *Sep. 11, 2018

(54) COATING COMPOSITION AND ARTICLES MADE THEREFROM

(75) Inventors: Charles F. Diehl, Durango, CO (US); Bernhard Kainz, Lauf (DE); Timothy J. Young, Bay City, MI (US); David L. Malotky, Midland, MI (US); Denise Lindenmuth, Ambler, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 377 days.

This patent is subject to a terminal disclaimer.

(21) Appl. No.: 13/983,861

(22) PCT Filed: Mar. 2, 2011

(86) PCT No.: PCT/US2011/026878
§ 371 (c)(1),
(2), (4) Date: Sep. 24, 2013

(87) PCT Pub. No.: WO2012/118500
PCT Pub. Date: Sep. 7, 2012

(65) Prior Publication Data
US 2014/0011018 A1    Jan. 9, 2014

(51) Int. Cl.
C09D 5/02 (2006.01)
C09D 167/00 (2006.01)
C09D 167/02 (2006.01)
B05D 1/00 (2006.01)
B05D 7/24 (2006.01)
B05D 7/14 (2006.01)
B05D 7/16 (2006.01)
C08L 67/00 (2006.01)
C08L 67/02 (2006.01)
C08K 3/011 (2018.01)
C09D 5/08 (2006.01)
C08J 3/05 (2006.01)
C09D 167/03 (2006.01)
C08K 5/00 (2006.01)
C08L 67/03 (2006.01)

(52) U.S. Cl.
CPC ............... *C09D 5/08* (2013.01); *C08J 3/05* (2013.01); *C09D 167/02* (2013.01); *B05D 1/00* (2013.01); *B05D 7/14* (2013.01); *B05D 7/16* (2013.01); *B05D 7/24* (2013.01); *B05D 2202/00* (2013.01); *B05D 2401/20* (2013.01); *B05D 2508/00* (2013.01); *B05D 2701/30* (2013.01); *C08J 2367/02* (2013.01); *C08K 3/011* (2018.01); *C08K 5/0025* (2013.01); *C08L 67/00* (2013.01); *C08L 67/02* (2013.01); *C08L 67/03* (2013.01); *C08L 2201/00* (2013.01); *C08L 2201/54* (2013.01); *C08L 2203/00* (2013.01); *C08L 2205/02* (2013.01); *C08L 2205/025* (2013.01); *C09D 5/02* (2013.01); *C09D 5/024* (2013.01); *C09D 5/025* (2013.01); *C09D 5/027* (2013.01); *C09D 167/03* (2013.01); *Y10T 428/254* (2015.01); *Y10T 428/31681* (2015.04); *Y10T 428/31786* (2015.04); *Y10T 428/31794* (2015.04)

(58) Field of Classification Search
None
See application file for complete search history.

(56) References Cited

U.S. PATENT DOCUMENTS 3,970,621 A * 7/1976 Kondo ................ C09D 5/4457
204/494
4,017,435 A * 4/1977 Kondo ................ C09D 5/4423
204/494

(Continued)

FOREIGN PATENT DOCUMENTS

EP    1 067 159 A   *  1/2001
EP      1193282        4/2002

(Continued)

OTHER PUBLICATIONS

Response to Japanese Office Action dated Jan. 13, 2015 for counterpart Japanese Patent Application No. 2013-556595.

(Continued)

*Primary Examiner* — Vivian Chen

(57) ABSTRACT

The instant invention provides an aqueous dispersion, a coating composition, coating layers and coated article made therefrom. The coating composition according to the present invention comprises: (1) the inventive aqueous dispersion comprising the melt blending product of: (a) from 50 to 99 percent by weight of one or more first polyesters, based on the total solid content of the dispersion, wherein said one or more first polyesters have an acid number in the range of from less than 15, for example less than 10, or in the alternative less than 5, based on the total solid content of the one or more first polyesters; (b) from 1 to 50 percent by weight of one or more stabilizing agents comprising at least one second polyester, based on the total solid content of the dispersion, wherein said second polyester has a carboxylic acid group and an acid number equal to or greater than 15, for example greater than 20, based on the solid content of the second polyester; (c) one or more neutralizing agents; and (d) from 15 to 90 percent by weight of water, based on the total weight of the dispersion; wherein said dispersion has a solid content of 10 to 85 percent, based on the total weight of the dispersion; and (2) one or more cross-linking agents.

5 Claims, No Drawings

(56) References Cited

U.S. PATENT DOCUMENTS

| | | | | |
|---|---|---|---|---|
| 4,983,691 | A * | 1/1991 | Hergenrother | C08G 63/916 525/437 |
| 4,988,777 | A * | 1/1991 | Hergenrother | C08G 63/916 525/437 |
| 5,356,989 | A * | 10/1994 | Tachika | C08G 63/6886 524/601 |
| 5,391,643 | A * | 2/1995 | Ridland | C09D 167/00 525/437 |
| 5,714,264 | A * | 2/1998 | Sacharski | B05D 7/16 427/195 |
| 5,869,567 | A * | 2/1999 | Fujita | C08J 3/03 523/500 |
| 5,965,213 | A * | 10/1999 | Sacharski | C08G 59/3209 427/475 |
| 6,177,487 | B1 * | 1/2001 | Sapper | C08G 59/423 523/333 |
| 6,200,683 | B1 * | 3/2001 | Montague | C09D 167/00 428/430 |
| 6,270,855 | B1 * | 8/2001 | Jung | B05D 1/265 427/482 |
| 6,291,579 | B1 * | 9/2001 | Kalck | C08G 18/0866 524/832 |
| 6,296,903 | B1 * | 10/2001 | Sapper | C08G 18/6229 427/195 |
| 6,521,679 | B1 * | 2/2003 | Okada | C08J 3/03 523/336 |
| 6,660,398 | B1 * | 12/2003 | Moens | C09D 167/00 427/189 |
| 6,946,515 | B1 * | 9/2005 | Lettmann | C08G 18/0823 524/507 |
| 7,803,865 | B2 * | 9/2010 | Moncla | C08J 7/047 524/523 |
| 8,349,929 | B2 * | 1/2013 | Kainz | B32B 15/08 524/284 |
| 8,357,749 | B2 * | 1/2013 | Malotky | C08J 3/05 524/304 |
| 8,722,787 | B2 * | 5/2014 | Romick | C09D 151/06 427/385.5 |
| 9,598,601 | B2 * | 3/2017 | Malotky | C08J 3/05 |
| 2001/0051227 | A1 * | 12/2001 | Jung | B05D 1/265 427/486 |
| 2002/0074681 | A1 * | 6/2002 | Lundgard | C08J 3/03 264/78 |
| 2003/0008161 | A1 * | 1/2003 | Kida | C09D 167/00 428/480 |
| 2003/0012950 | A1 * | 1/2003 | Kieser | C09D 5/02 428/396 |
| 2003/0092799 | A1 * | 5/2003 | Koenraadt | C08J 3/205 523/336 |
| 2004/0068027 | A1 * | 4/2004 | Daly | C08J 3/122 522/111 |
| 2004/0071955 | A1 * | 4/2004 | Moens | C09D 167/00 428/327 |
| 2004/0143073 | A1 * | 7/2004 | Bejko | B05D 5/061 525/418 |
| 2007/0142570 | A1 * | 6/2007 | Fugier | C09D 167/00 525/438 |
| 2007/0281235 | A1 * | 12/2007 | Ono | C08G 63/20 430/111.4 |
| 2008/0161487 | A1 | 7/2008 | Dorr et al. | |
| 2010/0010151 | A1 * | 1/2010 | Fugier | C09D 167/00 524/539 |
| 2010/0120987 | A1 * | 5/2010 | Oomori | C08J 5/046 525/286 |
| 2010/0137501 | A1 * | 6/2010 | Moncla | C08J 3/03 524/539 |
| 2010/0143837 | A1 | 6/2010 | Klier et al. | |
| 2011/0171481 | A1 * | 7/2011 | Kainz | B32B 15/08 428/480 |
| 2011/0195263 | A1 * | 8/2011 | Malotky | C08J 3/05 428/480 |
| 2011/0257273 | A1 * | 10/2011 | Yabuuchi | C08G 18/4063 514/772.3 |
| 2012/0108784 | A1 * | 5/2012 | Clauss | C08G 63/12 528/302 |
| 2013/0149453 | A1 * | 6/2013 | Romick | C09D 151/06 427/385.5 |
| 2014/0030535 | A1 * | 1/2014 | Makotky | C08J 3/05 428/480 |
| 2015/0337140 | A1 * | 11/2015 | Romick | C09D 5/08 428/413 |

FOREIGN PATENT DOCUMENTS

| | | | |
|---|---|---|---|
| EP | 1245603 | | 10/2002 |
| EP | 2 096 140 A | * | 9/2009 |
| EP | 2 272 927 A | * | 1/2011 |
| JP | 08-295791 | * | 11/1996 |
| JP | 08295791 | | 11/1996 |
| JP | H08295791 | | 11/1996 |
| JP | 10-007944 | * | 1/1998 |
| JP | 11-256083 A | * | 9/1999 |
| JP | 2002-256219 A | * | 9/2002 |
| JP | 2002-2256219 | | 9/2002 |
| WO | WO 01/28306 | * | 4/2001 |

OTHER PUBLICATIONS

Chinese Second Office Action dated Feb. 3, 2015 for counterpart Chinese Application No. 201180070356.7, 5 pages.
EP Office Action dated Oct. 13, 2013; from EP counterpart Application No. 11708634.8.
Instructions to EP Office Action dated Mar. 11, 2014; from EP counterpart Application No. 11708634.8.
EP Response to Office Action dated Apr. 1, 2014; from EP counterpart Application No. 11708634.8.
Response to Chinese Second Office Action dated Feb. 3, 2015 filed Apr. 28, 2015 for counterpart Chinese Application No. 201180070356.7, 6 pages.
Japanese Final Office Action dated Feb. 3, 2015 for counterpart Japanese Application No. 2013-556595, 5 pages.
Response to Japanese Final Office Action dated Feb. 3, 2015 filed Apr. 20, 2015 for counterpart Japanese Application No. 2013-556595, 4 pages.
Chinese Office Action dated Aug. 1, 2014; from Chinese counterpart Application No. 201180070356.7.
PCT/US2011/026878 International Search Report and Written Opinion dated Nov. 3, 2011.
Insructions to Chinese Office Action dated Oct. 7, 2014; from counterpart Chinese Application No. 201180070356.7.
Response to Chinese Office Action dated Oct. 13, 2014; from counterpart Chinese Application No. 201180070356.7.
Japanese Office Action dated Oct. 14, 2014 for counterpart Japanese Application No. 2013-556595.
EP Response to Office Action dated Nov. 16, 2015; from EP counterpart Application No. 11708634.8.
Database WPI, Week 199704, Thomson Scientific, London, GB, 1 page.
EPO Communication pursuant to Article 94(3) EPC dated May 13, 2015 for European Patent Application No. 11708634.8, 4 pages.
Korean Office Action dated Jul. 5 2017; from counterpart Korean Application No. 10-2013-7022716.

* cited by examiner

COATING COMPOSITION AND ARTICLES MADE THEREFROM

FIELD OF INVENTION

The instant invention relates to a coating composition and articles made therefrom.

BACKGROUND OF THE INVENTION

The application of various treatment and pretreatment solutions to metals to retard or inhibit corrosion is well established. This is particularly true in the area of metal food and beverage cans as well as non-food metal containers. Coatings are applied to the interior of such containers to prevent the contents from contacting the metal parts of the container. Contact between the metal and the food or beverage as well as non-food substances can lead to corrosion of the metal container, which can then contaminate the food or beverage or the non-food contents of such metal containers. Corrosion is particularly problematic when food and beverage products are highly acidic nature and/or are having a high salt content such as a rhubarb-based products or isotonic drinks. Also strong alkaline contents of non-food substances such as hair-dye may react with metal, for example, aluminum, parts of containers. The coatings applied, for example, to the interior of food and beverage cans also helps prevent corrosion in the head space of the cans, which is the area between the fill line of the food product and the can lid. The coatings may be applied to the outside of metal containers to provide protection against the external environment or to provide a decorative layer including fillers and/or pigments. In addition to corrosion protection, coatings for food and beverage cans should be non-toxic and inert, and, if applied to the internal surface, should not adversely affect the taste or appearance, e.g. color, of the food or beverage in the can or contribute to a contamination of the contents of the can. Resistance to "popping", "blushing" and/or "blistering" is also desired. Certain coatings are particularly applicable for application onto coiled metal stock, such as the coiled metal stock from which the ends of cans are made, "can end stock" and valve cups, e.g. top ends of aerosol cans. Since coatings designed for use on can end stock are applied prior to the ends being cut and stamped out of the coiled metal stock, they are also typically flexible and/or extensible. For example, can end stock is typically coated on both sides. Thereafter, the coated metal stock is punched and may be beaded or bent. It may also be scored for the "pop-top" opening and the pop-top ring is then attached with a pin that is separately fabricated. The end is then attached to the can body by an edge rolling process. Accordingly, the coating applied to the can end stock typically has a certain degree of toughness and flexibility, such that it can withstand extensive fabrication processes, in addition to some or all of the other desirable features discussed above. Various coatings such as epoxy-based and polyvinyl chloride-based, e.g. organosol type, coatings have been used in the past to coat the interior of metal cans to prevent corrosion. However, there is a need for food and beverage can liners as well as non-food container liners that provide improved properties such as having resistance to degradation in corrosive media as well as appropriate level of flexibility.

SUMMARY OF THE INVENTION

The instant invention provides an aqueous dispersion, a coating composition, coating layers and coated article made therefrom.

In one embodiment, the instant invention provides an aqueous dispersion comprising the melt blending product of: (a) from 50 to 99 percent by weight of one or more first polyesters, based on the total solid content of the dispersion, wherein said one or more first polyesters have an acid number in the range of from less than 15, for example less than 10, or in the alternative less than 5, based on the total solid content of the first polyester; (b) from 1 to 50 percent by weight of one or more stabilizing agents comprising at least one second polyester, based on the total solid content of the dispersion, wherein said second polyester has a carboxylic acid group and an acid number greater than 15, for example greater than 20, based on the solid content of the second polyester; (c) one or more neutralizing agents; and (d) from 15 to 90 percent by weight of water, based on the total weight of the dispersion; wherein said dispersion has a solid content of 10 to 85 percent, based on the total weight of the dispersion.

In an alternative embodiment, the instant invention further provides a method for producing a aqueous dispersion comprising the steps of: (1) selecting one or more first polyesters having an acid number in the range of from less than 15, for example less than 10, or in the alternative less than 5, based on the total solid content of the first polyester; (2) selecting one or more stabilizing agents comprising at least one second polyester having an acid number greater than 15, for example greater than 20, based on the total solid content of the second polyester; (3) selecting one or more neutralizing agents; (4) melt-blending said one or more first polyesters, one or more stabilizing agents in the presence of water and one or more neutralizing agents; (4) thereby producing an aqueous dispersion having a solid content of 10 to 85 percent, based on the total weight of the dispersion.

In another alternative embodiment, the instant invention further provides a coating composition comprising: (a) the inventive aqueous dispersion, as described hereinabove; (b) one or more cross-linking agents; (c) optionally one or more selected from the group consisting of a polyolefin dispersion, acrylic latex, epoxy resin dispersion, polyurethane dispersion, alkyd dispersion, vinyl acetate dispersion, and ethylene vinyl acetate dispersion.

In another alternative embodiment, the instant invention further provides a coating layer comprising at least one or more film layers derived from the inventive coating composition, as described hereinabove.

In another alternative embodiment, the instant invention further provides a coated article comprising: (1) one or more substrates; (2) at least one or more coating layers derived from the inventive coating composition, as described hereinabove.

In another alternative embodiment, the instant invention further provides a method for making a coated article comprising the steps of: (1) selecting a substrate; (2) selecting the inventive coating composition, as described hereinabove; (3) applying said coating composition to at least one surface of said substrate; (4) removing at least a portion of the water from said the coating composition; (5) thereby forming one or more coating layers associated with said substrate; and (6) thereby forming said coated substrate into a coated article.

In another alternative embodiment, the instant invention further provides a method for making a coated article comprising the steps of: (1) selecting a substrate; (2) forming said substrate into article; (3) selecting the coating composition, as described hereinabove; (4) applying said coating composition to at least one surface of said article; (5) removing at least a portion of the water from said the coating composition; (6) thereby forming one or more coating layers associated with at least one surface of said article; and (7) thereby forming said coated article.

In an alternative embodiment, the instant invention provides an aqueous dispersion, a coating composition, a coating layer, a coated article, method of producing the same, in accordance with any of the preceding embodiments, except that the first polyester has a glass transition temperature ($T_g$) of at least 30° C.; for example at least 40° C.; or in the alternative, at least 50° C.; or in the alternative, at least 60° C.; or in the alternative, at least 70° C.

In an alternative embodiment, the instant invention provides an aqueous dispersion, a coating composition, a coating layer, a coated article, method of producing the same, in accordance with any of the preceding embodiments, except that the substrate is a pre-coated substrate.

In an alternative embodiment, the instant invention provides an aqueous dispersion, a coating composition, a coating layer, a coated article, method of producing the same, in accordance with any of the preceding embodiments, except that the substrate is metal, wood, paper, plastic, glass, leather, and/or concrete.

In an alternative embodiment, the instant invention provides an aqueous dispersion, a coating composition, a coating layer, a coated article, method of producing the same, in accordance with any of the preceding embodiments, except that the dispersion and/or the coating composition derived therefrom further comprises a catalyst.

In an alternative embodiment, the instant invention provides an aqueous dispersion, a coating composition, a coating layer, a coated article, method of producing the same, in accordance with any of the preceding embodiments, except that the first polyester is a linear saturated aromatic polyester with a glass transition temperature of greater than 50° C. and an acid number of less than 5 mg KOH/g, and the second polyester is compatible with the first polyester, such that a dispersion with a volume average particle size of less than 5 microns is produced.

In an alternative embodiment, the instant invention provides an aqueous dispersion, a coating composition, a coating layer, a coated article, method of producing the same, in accordance with any of the preceding embodiments, except that the aqueous dispersion and/or the coating compositions derived therefrom further comprise one or more binder compositions such as acrylic latex, vinyl acrylic latex, styrene acrylic latex, vinyl acetate ethylene latex, polyurethane dispersion, alkyd dispersion, epoxy dispersion, polyolefin dispersion, and combinations thereof; optionally one or more fillers; optionally one or more additives such as catalysts, wetting agents, defoamers, flow agents, release agents, slip agents, anti-blocking agents, additives to mask sulfur staining, pigment wetting/dispersion agents, anti-settling agents, UV stabilizers, adhesion promoters; optionally one or more lubricants such as fatty acid ester wax, silicon-based wax, fluorine-based wax, polyethylene or any other similar polyolefin wax, carnauba wax, lanolin wax or the like; optionally one or more corrosion inhibitors such as aluminum, and zinc: optionally one or more pigments, e.g. titanium dioxide, barium sulfate, mica, calcium carbonate, silica, zinc oxide, milled glass, aluminum trihydrate, talc, antimony trioxide, fly ash, and clay or the like; optionally one or more co-solvents, e.g. glycols, glycol ether, 2,2,4-trimethyl-1,3-pentanediol monoisobutyrate, alcohols, mineral spirits, aromatic solvents and benzoate esters or the like; optionally one or more dispersants, e.g. aminoalcohols, and polycarboxylates; optionally one or more surfactants; optionally one or more preservatives, e.g. biocides, mildewcides, fungicides, algaecides, and combinations thereof; optionally one or more thickeners, e.g. cellulosic based thickeners such as hydroxyethyl cellulose, hydrophobically modified alkali soluble emulsions (HASE thickeners such as UCAR POLYPHOBE TR-116) and hydrophobically modified ethoxylated urethane thickeners (HEUR); or optionally one or more additional neutralizing agents, e.g. hydroxides, amines, ammonia, and carbonates; optionally one or more solvents or coalescing agents.

DETAILED DESCRIPTION OF THE INVENTION

The instant invention provides an aqueous dispersion, a coating composition, coating layers and coated article made therefrom.

The coating composition according to the present invention comprises: (1) the inventive aqueous dispersion comprising the melt blending product of: (a) from 50 to 99 percent by weight of one or more first polyesters, based on the total solid content of the dispersion, wherein said one or more first polyesters have an acid number in the range of from less than 15, for example less than 10, or in the alternative less than 5, based on the total solid content of the first polyester; (b) from 1 to 50 percent by weight of one or more stabilizing agents comprising at least one second polyester, based on the total solid content of the dispersion, wherein said second polyester has a carboxylic acid group and an acid number equal to or greater than 15, for example greater than 20, based on the solid content of the second polyester; (c) one or more neutralizing agents; and (d) from 15 to 90 percent by weight of water, based on the total weight of the dispersion; wherein said dispersion has a solid content of 10 to 85 percent, based on the total weight of the dispersion; and (2) one or more cross-linking agents.

Aqueous Dispersion

The aqueous dispersion according to the present invention comprises the melt blending product of: (a) from 50 to 99 percent by weight of one or more first polyesters, based on the total solid content of the dispersion, wherein said one or more first polyesters have an acid number in the range of from less than 15, for example less than 10, or in the alternative less than 5, based on the total solid content of the first polyester; (b) from 1 to 50 percent by weight of one or more stabilizing agents comprising at least one second polyester, based on the total solid content of the dispersion, wherein said second polyester has a carboxylic acid group and an acid number equal to or greater than 15, for example greater than 20, based on the solid content of the second polyester; (c) one or more neutralizing agents; and (d) from 15 to 90 percent by weight of water, based on the total weight of the dispersion; wherein said dispersion has a solid content of 10 to 85 percent, based on the total weight of the dispersion.

First Polyester

The aqueous dispersion comprises from 50 to 99 percent by weight of one or more first polyesters based on the total weight of the solid content of the aqueous dispersion. All individual values and subranges from 50 to 99 weight percent are included herein and disclosed herein; for example, the weight percent can be from a lower limit of 50, 55, 60, 65, or 70 weight percent to an upper limit of 60, 65, 70, 75, 80, 85, 90, 95, or 99 weight percent. For example, the aqueous dispersion may comprise from 55 to 95 percent by weight of one or more first polyester, based on the total weight of the solid content of the aqueous dispersion; or in the alternative, the aqueous dispersion may comprise from 60 to 90 percent by weight of one or more first polyester, based on the total weight of the solid content of the aqueous dispersion; or in the alternative, the aqueous dispersion may comprise from 65 to 90 percent by weight of one or more first polyester, based on the total weight of the solid content of the aqueous dispersion; or in the alternative, the aqueous dispersion may comprise from 75 to 95 percent by weight of one or more first polyester, based on the total weight of the solid content of the aqueous dispersion. The aqueous dispersion comprises at least one or more first polyesters. The first polyester is a thermosetting polyester. Suitable thermosetting polyesters (hydrophobic polyester) for use in the present invention include, but are not limited to, hydroxyl functional polyesters with medium to high molecular weight (>5000 g/mol Mw, preferably >10,000 g/mol $M_w$, and most preferably >20,000 g/mol $M_w$) polyester. Typically the hydroxyl number of the thermosetting polyester will be at least 3 mg KOH/g (based on resin solids) and preferably at least 5 mg KOH/g. The thermosetting polyester will typically have an acid number of <15 mg KOH/g (based on resin solids), preferably <10 mg KOH/g, and most preferably <5 mg KOH/g. Preferred polyester thermosetting resins have a glass transition temperature ($T_g$) of at least about 30° C., preferably greater than 50° C., and most preferably greater than 70° C.

The hydroxyl functional thermosetting polyester may be formed by conventional polycondensation techniques such as for example described in Zeno W. Wicks, Jr, Frank N. Jones, S. Peter. Pappas, "Organic Coatings, Science and Technology," pp 246-257 (John Wiley & Sons, 1999, second edition) and references therein or in Houben-Weyl, "Methoden der Organischen Chemie, Band E20, Makromolekulare Soffe, Polyester," pp 1405-1429. (Georg Thieme Verlag, Stuttgart 1987) and references therein. In one embodiment, a diol or polyol and a di-carboxylic acid or polycarboxylic acid are charged into a conventional polymerization vessel and reacted between about 150° C. and 280° C. for several hours. Optionally, an esterification catalyst may be used to decrease the reaction time. In general, to ensure the formation of a hydroxyl-group terminated polyester, a small excess of diol may be used. It is also understood that an esterifiable derivative of a polycarboxylic acid, such as a dimethyl ester or anhydride of a polycarboxylic acid, can be used to prepare the polyester.

In one embodiment of the invention, the thermosetting polyester is a linear saturated polyester. However, in some cases it might be desirable to introduce some branching points into the polyester. Triols or polyols or polyacids can be used to provide branched polyesters.

Suitable and typical dicarboxylic acids or polycarboxylic acids, or their corresponding alkyl esters, that may be used to form the thermosetting polyester include saturated as well as unsaturated dicarboxylic acids such as, but not limited to, for example, isophthalic acid, maleic acid, maleic anhydride, malonic acid, fumaric acid, succinic acid, succinic anhydride, glutaric acid, adipic acid, 2-methyl-1,6-hexanoic acid, pimelic acid, suberic acid, dodecanedioic acids, phthalic acid, phthalic anhydride, 5-tert butyl isophthalic acid, tetrahydrophthalic anhydride, hexahydrophthalic acid, hexahydrophthalic anhydride, endomethylenetetrahydrophthalic anhydride, azelaic acid, sebacic acid, tetrachlorophthalic anhydride, chlorendic acid, isophthalic acid, trimellitic anhydride, terephthalic acid, naphthalene dicarboxylic acid, cyclohexane-dicarboxylic acid, dimer fatty acid, or anhydrides of any of these acids, or mixtures thereof.

Suitable diols and polyols that may be used to form the thermosetting polyester include, but are not limited to, for example, ethylene glycol, diethylene glycol, triethylene glycol and higher polyethylene glycols, propylene glycol, dipropylene glycol, tripropylene glycol and higher polypropylene glycols, 1,3-propanediol, 1,4-butanediol and other butanediols, 1,5-pentanediol and other pentane diols, hexanediols, decanediols, and dodecanediols, glycerol, trimethylolpropane, trimethylolethane, neopentyl glycol, pentaerythritol, cyclohexanedimethanol, dipentaerythtritol, 1,2-methyl-1,3-propanediol, 1,4-benzyldimethanol, 2,4-dimethyl-2-ethylhexane-1,3-diol, isopropylidene bis(p-phenylene-oxypropanol-2), 4,4'-dihydroxy-2,2'-diphenylpropane, 1,3-cyclohexanedimethanol, 1,4-cyclohexanedimethanol (or mixtures of 1,3 and 1,4 cyclohexanedimethanol, may be cis or trans), sorbitol, or mixtures thereof.

Suitable thermosetting polyesters are available, for example, from EVONIK under the tradename DYNAPOL®.

In one embodiment, the hydroxyl functional, first polyester, may first be reacted with one or more multi-functional isocyanates such as, for example, isophorone diisocyanate (IPDI), hexamethylene diisocyanate (HDI), dicyclohexylmethane-4,4'-diisocyanate (H12MDI), and 1,3 or 1,4-bis (isocyanatomethyl)cyclohexane, or mixtures thereof, to produce a hydroxyl-functional polyester-carbamate polymer.

In another embodiment, the hydroxyl functional, thermosetting polyester may first be reacted with one or more partially blocked isocyanates or polyisocyanates. In a preferred embodiment, the partially blocked isocyanate is a polyisocyanurate compound, such as a trimer, having at least one free isocyanate group. More preferably, the blocked isocyanate has at least two unblocked isocyanate groups. The blocked isocyanate groups of the at least partially blocked polyisocyanate can be any combination of deblockable and/or non-deblockable isocyanate groups. Preferred blocking agents for forming deblockable isocyanate groups include, but are not limited to ε-caprolactam, diisopropylamine (DIPA), methyl ethyl ketoxime (MEKO), and/or mixtures thereof. Preferred blocking agents for forming non-deblockable isocyanate groups include, but are not limited to, glycidol, hydroxyethyl acrylate, alcohols, and glycols. In one preferred embodiment, the deblockable isocyanate groups do not appreciably deblock at a temperature of less than 50° C., more preferably the isocycanate groups do not appreciably deblock at a temperature of less than 100° C.

Stabilizing Agent Comprising a Second Polyester

The aqueous dispersion further comprises at least one or more stabilizing agents comprising one or more second polyesters to promote the formation of a stable dispersion. The second polyester has a carboxylic acid group and an acid number equal to or greater than 15, for example greater than 20. The aqueous dispersion comprises 1 to 50 percent by weight of one or more stabilizing agents, based on the total weight of the solid content of the dispersion. All individual values and subranges from 1 to 50 weight percent are included herein and disclosed herein; for example, the weight percent can be from a lower limit of 1, 3, 5, 10 weight percent to an upper limit of 15, 25, 35, 45, or 50 weight percent. For example, the dispersion may comprise from 1 to 25; or in the alternative, from 1 to 35; or in the alternative, from 1 to 40; or in the alternative, from 1 to 45 percent by weight of one or more stabilizing agents, based on the total weight of the solid content of the dispersion.

The second polyester is a high acid, water dispersible, hydrophilic polyester, which is used as the primary stabilizing agent for dispersing the first polyester resin. The second polyester typically has an acid number in the range of from equal to or greater than 15 mg KOH/g (based on resin solids), for example from 20 to 80 mg KOH/g (based on resin solids). The carboxylic acid functionality of the second polyester is critical to the present invention. In producing the waterborne dispersion, the acid functionality of the second polyester is neutralized with a suitable inorganic or organic base to provide colloidal stability. The high acid stabilizing polyester may also have hydroxyl functionality, but this is not required. Preferably the high acid stabilizing polyester has an OH number of at least 2 mg KOH/g (based on resin solids), preferably 5 mg KOH/g or greater, and most preferably 20 mg KOH/g or greater. The high acid stabilizing polyester may be produced by conventional polycondensation techniques such as for example described in Zeno W. Wicks, Jr, Frank N. Jones, S. Peter. Pappas "Organic Coatings, Science and Technology," pp 246-257 (John Wiley & Sons, 1999, second edition) and references therein or in Houben-Weyl, "Methoden der Organischen Chemie, Band E20, Makromolekulare Soffe, Polyester" pp 1405-1429. (Georg Thieme Verlag, Stuttgart 1987) and references therein. In one embodiment, a diol or polyol and a di-carboxylic acid or polycarboxylic acid are charged into a conventional polymerization vessel and reacted between about 150° C. and 280° C. for several hours. Optionally, an esterification catalyst may be used to decrease the reaction time. It may be preferable to use a two-step process to provide a carboxyl functional polyester. In one embodiment, an OH-functional polyester is first prepared so that there is little, if any, free carboxylic acid and/or carboxylate functions, and which then in a subsequent step is reacted with a cyclic dicarboxylic anhydride, in a ring-opening and monoester-forming reaction, with free carboxylic acid and/or carboxylate groups then being formed. The excess of OH functionality in the resin of the first step is designed in such a way that the final resin, after the reaction with the polyacid functional molecules, will provide a carboxyl terminated polyester resin in which the acid number is typically in the range of from equal to or greater than 15 mg KOH/g (based on resin solids), for example from 20 to 80 mg KOH/g (based on resin solids).

The carboxylic acid component of the high acid stabilizing polyester may contain one or more aliphatic, cycloaliphatic, araliphatic, and/or aromatic carboxylic acids with a COOH functionality of at least two, or anhydrides thereof. Suitable and typical dicarboxylic acids or polycarboxylic acids, or their corresponding alkyl esters, that may be used to form the high acid stabilizing polyester include, but are not limited to, saturated as well as unsaturated dicarboxylic acids such as, for example, but not limited to, maleic acid, maleic anhydride, malonic acid, fumaric acid, succinic acid, succinic anhydride, glutaric acid, adipic acid, 2-methyl-1,6-hexanoic acid, pimelic acid, suberic acid, dodecanedioic acids, phthalic acid, phthalic anhydride, 5-tert butyl isophthalic acid, tetrahydrophthalic anhydride, hexahydrophthalic acid, hexahydrophthalic anhydride, endomethylenetetrahydrophthalic anhydride, azelaic acid, fumaric acid, sebacic acid, tetrachlorophthalic anhydride, chlorendic acid, isophthalic acid, trimellitic anhydride, terephthalic acid, naphthalene dicarboxylic acid, cyclohexane-dicarboxylic acid, and mixtures thereof.

The glycol component of the high acid stabilizing polyester may be ethylene glycol, diethylene glycol, triethylene glycol and/or higher polyethylene glycols, propylene glycol, dipropylene glycol, tripropylene glycol and/or higher polypropylene glycols, 1,3-propanediol, 1,4-butanediol and other butanediols, 1,5-pentanediol and/or other pentane diols, hexanediols, decanediols, and/or dodecanediols, glycerol, trimethylolpropane, trimethylolethane, neopentyl glycol, pentaerythritol, cyclohexanedimethanol, a polyethylene or polypropylene glycol having a molecular weight of about 500 or less, dipentaeryhtritol, 1,3-butylethylpropanediol, 2-methyl-1,3-propanediol, 1,4-benzyldimethanol, 2,4-dimethyl-2-ethylhexane-1,3-diol, isopropylidene bis (p-phenylene-oxypropanol-2), and mixtures thereof. In some embodiments, the aliphatic glycol may contain from 2 to 8 carbon atoms 1,3-cyclohexanedimethanol, 1,4-cyclohexanedimethanol (or mixtures of 1,3 and 1,4 cyclohexanedimethanol, may be cis or trans), 2,2,4,4-tetramethyl-1,3-cyclobutanediol (may be cis, trans, or a mixture thereof) 4,4'-dihydroxy-2,2'-diphenylpropane or mixtures thereof.

The composition of the high acid stabilizing polyester (second polyester) must be chosen so that it exhibits good compatibility with the first polyester. If the compatibility is poor, a good water borne dispersion with small particle size (typically less than about 5 micron volume average particle size diameter) and good stability may not be produced. In addition, resulting coatings from such dispersions may have poor appearance and may show reduced performance in coatings evaluation tests because of lack of compatibility. For example, if an aliphatic, high acid polyester (second polyester) is used to disperse an aromatic, hydrophobic first polyester, a poor dispersion will typically result with large particle size (typically greater than 5 micron volume average particle size diameter). One way to assess compatibility is to melt mix the first polyester and the second polyester at a temperature above their respective melting points. A blend with good compatibility will typically result in a relatively clear or translucent blend, while an incompatible blend will typically result in an opaque or hazy, white melt blend. There may be other methods to determine compatibility such as morphology determination by optical microscopy or transmission electron microscopy of the blend.

In selected embodiments, the stabilizing agent may optionally include a surfactant. Other stabilizing agents that may be used include, but are not limited to, long chain fatty acids, fatty acid salts, or fatty acid alkyl esters having from 12 to 60 carbon atoms. In other embodiments, the long chain fatty acid or fatty acid salt may have from 12 to 40 carbon atoms.

Additional stabilizing agents that may be useful in the practice of the present invention include, but are not limited to, cationic surfactants, anionic surfactants, or non-ionic surfactants. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants. Stabilizing agents useful in the practice of the present invention can be either external surfactants or internal surfactants. External surfactants are surfactants that do not become chemically reacted into the base polymer during dispersion preparation. Examples of external surfactants useful herein include, but are not limited to, salts of dodecyl benzene sulfonic acid and lauryl sulfonic acid salt. Internal surfactants are surfactants that do become chemically reacted into the base polymer during dispersion preparation. An example of an internal surfactant useful herein includes 2,2-dimethylol propionic acid and its salts. Additional surfactants that may be useful in the practice of the present invention include cationic surfactants, anionic surfactants, non-ionic surfactants, or combinations thereof. Various commercially available surfactants may be used in embodiments disclosed herein, including: OP-100 (a sodium stearate), OPK-1000 (a potassium stearate), and OPK-181 (a potassium oleate), each available from RTD Hallstar; UNICID 350, available from Baker Petrolite; DISPONIL FES 77-IS, DISPONIL TA-430, Disponil FES-32, and Diponil FES-993, each available from Cognis; RHODAPEX CO-436, SOPROPHOR 4D384, 3D-33, and 796/P, RHODACAL BX-78 and LDS-22, RHODAFAC RE-610, and RM-710, and SUPRAGIL MNS/90, each available from Rhodia; and TRITON QS-15, TRITON W-30, DOWFAX 2A1, DOWFAX 3B2, DOWFAX 8390, DOWFAX C6L, TRITON X-200, TRITON XN-45S, TRITON H-55, TRITON GR-5M, TRITON BG-10, and TRITON CG-110, each available from The Dow Chemical Company, Midland, Mich., and ESPERSE grades E-100, E-506, E-328, E-355, and E-600, each available from Ethox Chemicals, LLC.

Additional stabilizing agents which could be used are solution or suspension polymers consisting of ethylenically unsaturated monomers such as acrylic and/or methacrylic acid and their ($C_1$-$C_{30}$) esters or amides; acrylamide/methacrylamide and their N-substituted derivatives; acrylonitrile; styrene and substituted styrene derivatives.

Exemplary polymeric stabilizing agents include, but are not limited to, amphiphilic copolymer compositions, the copolymer comprising the reaction product of (i) from 5 to 95 wt. % of one or more hydrophilic monomers and (ii) from 5 to 95 wt. % of one or more copolymerizable ethylenically unsaturated hydrophobic monomers. These materials are water soluble or emulsifiable, especially upon neutralization and can act as colloidal stabilizers. Exemplary stabilizing agents, for example, include, but are not limited to, butylacrylate and laurylmethacrylate.

Representative nonionic, water-soluble monomers suitable for production of amphiphilic copolymer compositions, include, but are not limited to, acrylamide, methacrylamide, N,N-dimethylacrylamide, N,N-diethylacrylamide, N-isopropylacrylamide, N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, t-butylacrylamide, N methylolacrylamide, alkyl(meth)acrylates such as methyl(meth)acrylate, butyl acrylate and ethylacrylate, vinyl monomers such as ethylene, styrene, divinylbenzene, di-isobutylethylene, vinyl acetate and N-vinyl pyrrolidone, and allyl monomers such as allyl (meth)acrylate.

Representative cationic, water-soluble monomers suitable for production of amphiphilic copolymer compositions include, but are not limited to, quaternary ammonium salts of amine functionalized monomers such as acrylamide, methacrylamide, N,N-dimethylacrylamide, N,N-diethylacrylamide, N-isopropylacrylamide, N-vinylformamide, N-vinylmethylacetamide, N-vinyl pyrrolidone, t-butylacrylamide, N-methylolacrylamide, tributylammonium ethyl (meth)acrylate TBAEMA, DMAEMA, DMAPMAM, diallyldimethylammonium chloride (DADMAC), methylacrylamidopropyltrimethylammonium chloride (MAPTAC), acrylamidopropyltrimethylammonium chloride (APTAC), N-vinyl pyrrolidone, vinylimidazole, polyquaternium-11 and polyquaternium-4.

"Anionic" or "acid-containing monomer" suitable for production of amphiphilic copolymer compositions include, but are not limited to, ethylenically unsaturated monomers containing carboxylic acid, phosphonic acid, phosphinic acid, sulfinic acid and sulfonic acid groups. Suitable examples include (meth)acrylic acid, maleic acid, succinic acid, itaconic acid, vinyl phosphonic acid and vinylsulfonic acid.

In an alternative embodiment, one or more stabilizing agents may be based on resins such as polyester, epoxy resins, polyamide resins, which might be reacted with acrylic resins or acrylic monomers to form polyester acrylate, polyamide acrylates epoxy resin acrylates.

Polyester acrylates as stabilizing agents may be formed via in-situ polymerization of copolymerizable ethylenically unsaturated monomers in presence of polyesters. Examples include ethylenically unsaturated mono- or polyfunctional acids, ethylenically unsaturated mono- or polyfunctional acid esters, amides, nitriles as well as vinyl monomers and vinyl ester with a polyester in or without presence of a reaction fluid. Polyester acrylates in solvents can be dried according to suitable methods known to those of ordinary skill in the art.

Suitable epoxy resins for producing stabilizing agents may be obtained in accordance with conventional procedures well known to those of ordinary skill in the art by reacting a polyepoxide with a suitable polynucleophile. Suitable epoxides include, but are not limited to, glycidyl ethers, and other epoxy group containing molecules. Suitable polynucleophiles include, but are not limited to, polyhydric phenols, and poly phenols, polythiols, aliphatic polyalcohols or polybasic acids or polyamines. Exemplary suitable epoxies, for example, include, but are not limited to, glycidyl ether that contains at least two glycidyl ether groups per polyglycidyl ether molecule (e.g. an at least diglycidyl ether) with a polyhydric phenol that contains at least two hydroxyl groups in the polyhydric polyphenol (e.g., at least dihydric phenol or a diphenol) in presence of a conventional catalyst at an elevated temperature with or without solvent present. Another class of epoxy resins may be obtained in accordance with conventional procedures well known to those of ordinary skill in the art by reacting, for example, a polyglycidyl ether that contains at least two glycidyl ether groups per polyglycidyl ether molecule (e.g. an at least diglycidyl ether) with a polybasic acid that contains at least two carboxyl groups per polybasic acid molecule (e.g. an at least dibasic polycarboxylic acid) in presence of a conventional catalyst at an elevated temperature with or without solvent present.

Epoxy acrylates for producing stabilizing agents may be formed via in-situ polymerization of copolymerizable ethylenically unsaturated monomers in presence of epoxy resins. Examples include, but are not limited to, ethylenically unsaturated mono- or polyfunctional acids, ethylenically unsaturated mono- or polyfunctional acid esters, amides, nitriles as well as vinyl monomers and vinyl ester with an epoxy resins in or without presence of a reaction fluid. Alternatively a polymeric acid functional acrylic resin can be reacted with an epoxy resin in the presence of a suitable catalyst to form epoxy acrylate. Epoxy acrylates in solvents can be dried according to suitable methods known to those of ordinary skill in the art. In one embodiment an acid functionalized polyester may be used, wherein the epoxy is reacted, for example, with an excess of an acid functional polyester.

Neutralizing Agent

The stabilizing agent may be partially or fully neutralized with a neutralizing agent. In certain embodiments, neutralization of the stabilizing agent, the second polyester, may be from 50 to 250 percent on a molar basis; or in the alternative, it may be from 50 to 200 percent on a molar basis; or in the alternative, it may be from 50 to 150 percent on a molar basis; or in the alternative, it may be from 50 to 120 percent on a molar basis. For example, the neutralizing agent may be a base, such as ammonium hydroxide, sodium hydroxide, or potassium hydroxide. Other neutralizing agents can include lithium hydroxide, for example. In another alternative, the neutralizing agent may, for example, be a carbonate. In another alternative, the neutralizing agent may, for example, be any amine such as monoethanolamine, or 2-amino-2-methyl-1-propanol (AMP). Amines useful in embodiments disclosed herein may include diethanolamine, triethanolamine, and TRIS AMINO™ (each available from Angus), NEUTROL™ TE (available from BASF), as well as triisopropanolamine, diisopropanolamine, and N,N-dimethylethanolamine (each available from The Dow Chemical Company, Midland, Mich.). Other useful amines may include ammonia, monomethylamine, dimethylamine, trimethylamine, monoethylamine, diethylamine, triethylamine, mono-n-propylamine, butylamine, dibutylamine, tributylamine, dimethyl benzyl amine, dimethyl n-propylamine, N-methanol amine, N-aminoethylethanolamine, N-methyl-diethanolamine, monoisopropanolamine, N,N-dimethyl propanolamine, 2-amino-2-methyl-1-propanol, 1,2-diaminopropane, tris(hydroxymethyl)-aminomethane, ethylenediamine N,N,N'N'-tetrakis(2-hydroxylpropyl)ethylenediamine, N,N,N',N' tetramethylpropanediamine, 3-methoxypropyl amine, imino bis-propyl amine and the like. In some embodiments, mixtures of amines or mixtures of amines and other surfactants may be used. In one embodiment, the neutralizing agent may be a polymeric amine, e.g. diethylene triamine. Those having ordinary skill in the art will appreciate that the selection of an appropriate neutralizing agent depends on the specific composition formulated, and that such a choice is within the knowledge of those of ordinary skill in the art. In one embodiment, amines with boiling points below 250° C. may be used as the neutralizing agents.

Fluid Medium

The aqueous dispersion further comprises a fluid medium. The fluid medium may be any medium; for example, the fluid medium may be water. The aqueous dispersion comprises from 15 to 90 percent by weight of water, based on the weight of the dispersion; for example, the dispersion comprises from 20 to 85 percent by weight of water, based on the weight of the dispersion; or in the alternative from 30 to 75 percent by weight of water, based on the weight of the dispersion; or in the alternative from 40 to 75 percent by weight of water, based on the weight of the dispersion; or in the alternative from 40 to 65 percent by weight of water, based on the weight of the dispersion. Water content of the dispersion may preferably be controlled so that the solids content (one or more first polyesters plus stabilizing agent comprising a second polyester) is in the range of from 10 to 85 percent by weight, based on the weight of the dispersion. For example, the dispersion comprises from 20 to 70 percent by weight of solid contents (one or more first polyesters plus stabilizing agent comprising a second polyester), based on the weight of the dispersion; or in the alternative, from 25 to 70 percent by weight of solid contents (one or more first polyesters plus stabilizing agent comprising a second polyester), based on the weight of the dispersion; or in the alternative, from 35 to 70 percent by weight of solid contents (one or more first polyesters plus stabilizing agent comprising a second polyester), based on the weight of the dispersion; or in the alternative, from 35 to 65 percent by weight of solid contents (one or more first polyesters plus stabilizing agent comprising a second polyester), based on the weight of the dispersion; or in the alternative, from 40 to 70 percent by weight of solid contents (one or more first polyesters plus stabilizing agent comprising a second polyester), based on the weight of the dispersion; or in the alternative, from 40 to 65 percent by weight of solid contents (one or more first polyesters plus stabilizing agent comprising a second polyester), based on the weight of the dispersion; or in the alternative, from 45 to 65 percent by weight of solid contents (one or more first polyesters plus stabilizing agent comprising a second polyester), based on the weight of the dispersion; or in the alternative, from 50 to 70 percent by weight of solid contents (one or more first polyesters plus stabilizing agent comprising a second polyester), based on the weight of the dispersion.

The fluid medium may optionally contain one or more suitable solvents. For example the one or more optional solvents include but are not limited to, e.g. glycols, glycol ether, 2,2,4-trimethyl-1,3-pentanediol monoisobutyrate, alcohols, ketones, glycol ether esters, mineral spirits, aromatic solvents and/or esters or the like; optionally one or more dispersants, e.g. aminoalcohols, and/or polycarboxylates.

Additional Components

The aqueous dispersion of the present invention may optionally be blended with one or more binder compositions such as acrylic latex, vinyl acrylic latex, styrene acrylic latex, vinyl acetate ethylene latex, epoxy dispersion, polyurethane dispersion, alkyd dispersion, polyolefin dispersion, and combinations thereof; optionally one or more fillers; optionally one or more additives such as catalysts, wetting agents, defoamers, flow agents, release agents, slip agents, anti-blocking agents, additives to mask sulfur staining, pigment wetting/dispersion agents, anti-settling agents, UV stabilizers, adhesion promoters; optionally one or more lubricants such as fatty acid ester wax, silicon-based wax, fluorine-based wax, polyethylene or any other similar polyolefin wax, carnauba wax, lanolin wax or the like; optionally one or more corrosion inhibitors such as aluminum, and zinc: optionally one or more pigments, e.g. titanium dioxide, barium sulfate, mica, calcium carbonate, silica, zinc oxide, milled glass, aluminum trihydrate, talc, antimony trioxide, fly ash, and clay or the like; optionally one or more co-solvents, e.g. glycols, glycol ether, 2,2,4-trimethyl-1,3-pentanediol monoisobutyrate, alcohols, mineral spirits, aromatic solvents and benzoate esters or the like; optionally one or more dispersants, e.g. aminoalcohols, and polycarboxylates; optionally one or more surfactants; optionally one or more preservatives, e.g. biocides, mildewcides, fungicides, algaecides, and combinations thereof; optionally one or more thickeners, e.g. cellulosic based thickeners such as hydroxyethyl cellulose, hydrophobically modified alkali soluble emulsions (HASE thickeners such as UCAR POLYPHOBE TR-116) and hydrophobically modified ethoxylated urethane thickeners (HEUR); or optionally one or more additional neutralizing agents, e.g. hydroxides, amines, ammonia, and carbonates; optionally one or more solvents or coalescing agents.

In addition, the aqueous dispersion may be blended with one or more dispersions, emulsions, suspensions, colloidal suspensions, and the like. For example the aqueous dispersion of the invention may be blended with polyurethane dispersion, alkyd dispersion, epoxy dispersion, vinyl acetate emulsion, acrylic emulsion, polyolefin dispersion, vinyl acetate ethylene emulsion, and/or the like. The addition of the additional components, as described herein, may be achieved as part of the process for making the dispersion, i.e. the additional components are added while producing the aqueous dispersion; or in the alternative, the additional components may added post aqueous dispersion production, i.e. the additional components are added into the aqueous dispersion after the dispersion is produced; or in the alternative, combinations thereof, i.e. additional components may be added during the process for making the dispersion and additionally such additional components are added post dispersion production as well.

Crosslinking Agent

The aqueous dispersion may optionally further comprise at least one or more crosslinking agents to promote crosslinking and or one or more catalyst to increase the rate of crosslinking. Such catalysts are generally known, and the selection of suitable catalyst typically depends on the selection of the crosslinking agent and other factors such as conditions for such crosslinking. Such catalysts include, but are not limited to, depending on type of crosslinker—strong acids, weak acids or compounds containing metals, such as dodecyl benzene sulfonic acid, p-toluene sulfonic acid, di-nonylnaphtalene disulfonic acid, methane sulfonic acid, phosphoric acid or weak acids such as ammonium or phosphonium salts or tin, bismuth, zirconium or aluminum chelate compounds. Exemplary catalysts include, but are not limited to, NACURE™, K-Kure™ and K-Kat™, available from King Industries, CYCAT™ from Cytec Industries, and/or FASCAT™ from Arkema Inc. The aqueous dispersion of the instant invention comprises 0.5 to 50 percent by weight of one or more crosslinking agents, based on the total weight of the solid content of the dispersion. All individual values and subranges from 0.5 to 50 weight percent are included herein and disclosed herein; for example, the weight percent can be from a lower limit of 0.5, 1, 3, 5, 10, 15, or 20 weight percent to an upper limit of 10, 12, 15, 18, 20, 25, 30, 35, 40, 45, or 50 weight percent. For example, the dispersion may comprise from 1 to 18; or in the alternative, from 1 to 15; or in the alternative, from 1 to 12; or in the alternative, from 1 to 10; or in the alternative, from 1 to 20; or in the alternative, from 1 to 30; or in the alternative, from 1 to 40; or in the alternative, from 1 to 45; or in the alternative, from 1 to 50 percent by weight of one or more crosslinking agents, based on the total weight of the solid content of the dispersion. In selected embodiments the crosslinking agent may, for example, be phenol-formaldehyde resins, amino-formaldehyde resins including, but not limited, to urea-formaldehyde resins, melamine formaldehyde resins, benzoguanamine formaldehyde resins, anhydride resins, epoxy group containing resins such as epoxy resins, epoxy group containing polyester or acrylic resins and blocked or un-blocked isocyanate resins, and combinations of two or more thereof, provided that the combinations of such crosslinkers is compatible.

Crosslinking agent may be a compound, which reacts with a reactive functional group contained in the dispersion formulation; thereby facilitating their crosslinking. Such functional groups can be present in both the first polyester as well as the stabilizing agent comprising a second polyester.

For example, reactive functional groups include, but are not limited to, acid groups such as carboxylic acid groups, free or in the neutralized form, or any functional groups having another active hydrogen by another component such as alcohol groups, amino groups, epoxy groups, or the like.

Crosslinkable functional groups in the cross-linking agent are groups capable of reacting with the reactive functional group of the first polyester or the stabilizing agent comprising a second polyester. For example, a carbodiimide group, an oxazoline group, an isocyanate group, an epoxy group, a methylol group, an aldehyde group, an acid anhydride group, a hydroxy group, an aziridinyl group or a silane group can be used in a crosslinker.

Another possibility of crosslinking acid functional groups is by use of multivalent metal ions by reaction of the aforementioned acid groups with a multivalent metal ion containing substance, such as zinc oxide.

Carboxylic acids could also be crosslinked in reactions with multifunctional olefinic unsaturated substances under catalysis of a strong acid. Multifunctional carbonates could also react with carboxylic acids to give ester linkages with liberation of carbon dioxide.

In the alternative, crosslinking may be accomplished via free radical crosslinking, initiated by addition of peroxides or via radiation, e.g., electron beam.

With respect to crosslinkable functional groups, one or more may be present in a crosslinking agent. In the alternative, two or more crosslinkable functional groups may be present in a single molecule.

The cross-linking agent having the above described crosslinkable functional group may be a waterdispersed or waterdispersible or water-soluble substance. In one embodiment, exemplary crosslinking agents include, but are not limited to, an aqueous monomeric or polymeric substance, which contains two or more oxazoline groups, carbodiimide groups, epoxy groups, isocyanate groups, methylol groups etc. or several of these per molecule.

An exemplary oxazoline crosslinking agent is an aqueous polymer having two or more oxazoline groups in its molecules, substances can be obtained by polymerizing an oxazoline group-containing monomer and, as required, an ethylenic unsaturated monomer. Alternatively an oxazoline crosslinking agent can also be obtained by reaction between a nitrile group and an aminoethanol group, dehydration of a hydroxylalkylamide group and the like.

Crosslinking agents having two or more carbodiimide groups can be produced from diisocyanate compounds by a condensation reaction accompanied by decarboxylation reaction of a diisocyanate compound. Examples of the diisocyanate compound include, but are not limited to, 1,5-naphthylene diisocyanate, 4,4'-diphenylmethane diisocyanate, 4,4'-diphenyldimethylmethane diisocyanate, 1,4-phenylene diisocyanate, 2,4-tolylene diisocyanate, 2,6-tolylene diisocyanate, hexanemethylene diisocyanate, cyclohexane-1,4-diisocyanate, xylylene diisocyanate, isophorone diisocyanate, dicyclohexylmethane-4,4'-diisocyanate, methylcyclohexane diisocyanate, and tetramethylxylylene diisocyanate and the like. These compounds may also be used as mixtures.

Monofunctional isocyanates may be included to control the resin molecular chain length such as phenyl isocyanate, tolyl isocyanate, cyclohexylisocyanate, dimethylphenyl isocyanate, butylisocyanate, and naphthyl isocyanate are useful.

Diisocyanate substances may be partially reacted with aliphatic compounds, alicyclic compounds, or aromatic compounds having a hydroxyl group, an imino group, an amino group, a carboxyl group, a mercapto group, an epoxy group, and the like.

In the condensation reaction accompanied by decarboxylation of a diisocyanate compound, a carbodiimidization catalyst can be used. Usable as such a catalyst are, for example, phospholene oxides such as 1-phenyl-2-phospholene-1-oxide, 3-methyl-2-phospholene-1-oxide, 1-ethyl-2-phospholene-1-oxide, and 3-phospholene isomers thereof.

In order to convert a carbodiimide group-containing polymer into an aqueous polymer, a hydrophilic segment is provided in the molecular structure of the carbodiimide group-containing polymer. For example, an aqueous polymer containing a carbodiimide group can be obtained by providing a hydrophilic segment having a functional group which has reactivity with an isocyanate group. Usable as the hydrophilic segment are: quaternary ammonium salts of dialkylamino alkylamine (e.g., quaternary ammonium salts of 2-dimethylaminoethanol); quaternary salts of dialkylamino alkylamine (e.g., 3-dimethylamino-n-propylamine); alkyl sulfonic acid salts having at least one reactive hydroxyl group (e.g., sodiumhydroxypropanesulfonate); a mixture of polyethylene oxide or polyethylene oxide, whose terminal is capped with an alkoxy group, and a polypropylene oxide (e.g., polyethylene oxide whose terminal position is capped with a methoxy group or an ethoxy group).

As an aqueous cross-linking agent containing an epoxy group, there are exemplified sorbitol polyglycidyl ether, glycerol triglycidyl ether, polyglycerol polyglycidylether trimethylolpropane triglycidyl ether, poly(ethyleneglycol) diglycidyl ether, poly(propyleneglycol) diglycidyl ether, phenol ethyleneoxide glycidyl ether, and lauryl alcohol ethyleneoxide glycidyl ether or the like. In addition to the above, mentioned as examples are: a water-soluble epoxy resin obtained by reacting a carboxy compound, which is obtained through a reaction between a polyoxyethylene polyol compound and an acid anhydride compound, and an epoxy resin having two or more epoxy groups in its molecules; and a self-emulsifiable epoxy resin composition obtained by mixing the water-soluble epoxy resin and the epoxy resin having two or more epoxy groups in its molecules. Such resins can be obtained for example under the tradenames of XZ 92533.00, XZ 92598.00 and XZ 92446.00 from The Dow Chemical Company, Midland, Mich. Examples of the anhydride compound include, but not particularly limited to, preferably aromatic anhydrides such as phthalic anhydride, trimellitic anhydride, and pyromellitic anhydride; and cyclic aliphatic anhydrides such as maleic anhydride, succinic anhydride, tetrahydrophthalic anhydride, methyl tetrahydrophthalic anhydride, methyl nadic anhydride, alkenyl succinic anhydride, hexahydrophthalic anhydride, and methyl hexahydrophthalic anhydride. There is no limitation on the epoxy resin having two or more epoxy groups in its molecules, and all known epoxy resins with an epoxy functionality of greater or equal to two can be used. Examples are polyglycidyl ether obtained from epichlorohydrin and a polyhydric compound such as, phenol novolac, and cresol novolac bisphenol A, bisphenol F, bisphenol S, resorcinol, hydroquinone or catechol; alkylene oxide-added bisphenol A; polyalcohols such as polypropylene glycol, 1,6-hexanediol, trimethylol propane, glycerin, cyclohexanedimethanol; and polyglycidyl ester and polyglycidyl amine of polycarboxylic acids such as adipic acid, phthalic acid, dimer acid and the like.

Aqueous cross-linking agent containing an isocyanate group are, for example: polyisocyanate mainly containing at least one member selected from the group consisting of an isocyanurate group-containing polyisocyanate, an urethodione group-containing polyisocyanate, an urethodione group/isocyanurate group containing polyisocyanate, an urethane group containing polyisocyanate, an allophanate group containing polyisocyanate, a biuret group containing polyisocyanate, a carbodiimide group containing polyisocyanate, and an urethodione group containing polyisocyanate, each of which contains 1,6-hexamethylene diisocyanate and/or isophorone diisocyanate as a raw material; and a self-emulsifiable polyisocyanate obtained by reacting a hydrophilic surfactant having at least one active hydrogen group which can react with an isocyanate group or polyethylene ether alcohol containing at least three poly-ethylene oxide units with fatty acid ester in which the sum of the number of carbons of fatty acid and a hydroxyl containing compound as raw materials is 8 or more and which has at least one active hydrogen group which can react with an isocyanate group. In addition to the above, an urethane group-containing polyisocyanate obtained by reaction between 1,6-hexamethylenediisocyanate and/or an isophorone diisocyanate and an active hydrogen group-containing compound or polyisocyanate obtained by an allophanatization reaction, carbodiimidization reaction, urethodionization reaction, and biuretization reaction of these diisocyanate compounds can be mentioned.

Examples of suitable crosslinking agents containing an aldehyde are waterdispersed or waterdispersible or water-soluble phenol formaldehyde resins, amino formaldehyde resins or combinations thereof.

Phenol formaldehyde crosslinking agents include, but are not limited to, reaction products of aldehydes with phenols. Preferred aldehydes but not exclusive are formaldehyde and acetaldehyde. A large variety of phenols can be used such as but not exclusive phenol, cresol, p-phenylphenol, p-tert-butylphenol, p-tert-amylphenol, cyclopentylphenol, cresylic acid, bisphenol-A, bisphenol-F and the like and combinations thereof. Also acid functional phenols could be used in making phenol formaldehyde resins. The crosslinkers can be unetherified or etherified with alcohols or polyols. These phenol formaldehyde resins may be soluble or self-emulsifiable in water or can be stabilized by use of colloid stabilizers such as polyvinyl alcohol.

Amino formaldehyde crosslinking agents include, but are not limited to, reaction products of aldehydes with amino or amido group containing molecules. Exemplary aldehydes include, but are not limited to, formaldehyde and acetaldehyde. A large variety of amino or amido group containing molecules can be used such as but not exclusive urea, melamine, benzoguanamine, acetoguanamine, glycoluryl and the like. Suitable amino crosslinking resins include melamine-formaldehyde, urea-formaldehyde, benzoguanamine-formaldehyde, acetoguanamine-formaldehyde, glycoluryl-formaldehyde resins. Also the methylol groups of an amino formaldehyde resin can be partially or fully etherified with at least one of the groups of monohydric aliphatic alcohols such as methanol and/or n-butanol. These amino formaldehyde resins may be soluble or self-emulsifiable in water or can be stabilized by use of colloid stabilizers such as polyvinyl alcohol can be used to stabilize the amino formaldehyde dispersions.

Commercially available amino-formaldehyde resins which are water soluble or water dispersible and useful for the instant purpose include Cymel™ 301, Cymel™ 303, Cymel™ 370, and Cymel™ 373 (all being products of Cytec Surface Specialties, Brussels, Belgium). Other aldehydes used to react with the amino compound to form the resinous material are crotonic aldehyde, acrolein, or compounds which generate aldehydes, such as hexamethylene-tetramine, paraldehyde, and the like.

Another class of crosslinking agents for carboxylic acid groups are water-soluble hydroxyalkylamide crosslinkers such as Bis(N,N'-dihydroxyethyl)adipamide and the like. Such compounds are commercially available under the tradename of PRIMID™ crosslinker resins from EMS-PRIMID in Switzerland, for example PRIMID™ XL-522, PRIMID™ SF-4510 and PRIMID™ QM-1260

The one or more crosslinking agents may be added to the aqueous dispersion as part of the aqueous dispersion formulation process; or in the alternative, the one or more crosslinking agents may be added to the aqueous dispersion post dispersion formulation process.

In one embodiment, depending on the type of food or beverage which is to be contained in a coated container, and on required coating properties it may be beneficial to combine several crosslinkers or some crosslinkers may be more suited than others. Some crosslinkers may not be suited for all applications. Some crosslinkers may require the addition of catalysts for proper cure.

Crosslinkers will help to build thermoset networks, which is indicated by higher values of MEK Double Rubs compared to an identical formulation not containing the crosslinker.

Forming the Dispersion

The aqueous dispersion can be formed by any number of methods recognized by those having skill in the art. Dispersion equipment can be operated in batch, semi-batch, or continuous mode. Examples of mixers include rotor-stator, microfluidizer, high pressure homogenizer, ultrasonic, impinging jet, Cowles™ blade, planetary mixers, and melt kneading devices such as extruders.

In one embodiment, one or more first polyesters, one or more stabilizing agents comprising a second polyester are melt-kneaded in an extruder along with water and optionally one or more neutralizing agents, such as ammonia, potassium hydroxide, amine, or a combination of two or more, to form a dispersion. In another embodiment, one or more first polyesters, one or more stabilizing agents comprising a second polyester are compounded, and then melt-kneaded in an extruder in the presence of water, and optionally one or more neutralizing agents thereby forming a dispersion. In some embodiments, the dispersion is first diluted to contain from 1 to 20 percent, e.g., 1 to 5 percent or 1 to 3 percent, by weight of water, and then, subsequently, further diluted to comprise from 15 to 90 percent by weight of water, based on the weight of dispersion. In one embodiment, further dilution may be accomplished via a solvent. In one embodiment, the dispersion is free of any solvent.

Any melt-kneading means known in the art may be used. In some embodiments, a kneader, a BANBURY® mixer, single-screw extruder, or a multi-screw extruder, e.g. a twin screw extruder, melt pump in connection with a rotor stator is used. A process for producing the dispersions in accordance with the present invention is not particularly limited. For example, an extruder, in certain embodiments, for example, a twin screw extruder, is coupled to a back pressure regulator, melt pump, or gear pump. Exemplary embodiments also provide a base reservoir and an initial water reservoir, each of which includes a pump. Desired amounts of base and initial water are provided from the base reservoir and the initial water reservoir, respectively. Any suitable pump may be used, but in some embodiments, for example, a pump that provides a flow of about 150 cc/min at a pressure of 240 bar is used to provide the base and the initial water to the extruder. In other embodiments, a liquid injection pump provides a flow of 300 cc/min at 200 bar or 600 cc/min at 133 bar. In some embodiments, the base and initial water are preheated in a preheater.

One or more first polyesters, in the form of, for example, pellets, powder, or flakes, are fed from the feeder to an inlet of the extruder where the resin is melted or compounded. One or more additional components may optionally be fed simultaneously with one or more first polyesters into the extruder via the feeder; or in the alternative, one or more additional components may be compounded into one or more first polyesters, and then fed into the extruder via the feeder. In the alternative, additional one or more additional components may optionally further be metered via an inlet prior to the emulsification zone into the molten compound comprising one or more first polyesters. In some embodiments, the stabilizing agent comprising a second polyester is added to one or more first polyesters through and along with the first polyesters and in other embodiments, the stabilizing agent comprising a second polyester is provided separately to the twin screw extruder. The resin melt is then delivered from the mix and convey zone to an emulsification zone of the extruder where the initial amount of water and base from the water and base reservoirs are added through an inlet. In some embodiments, stabilizing agent comprising a second polyester may be added additionally or exclusively to the water stream. In some embodiments, further dilution water may be added via water inlet from water reservoir in a dilution and cooling zone of the extruder. Typically, the dispersion is diluted to at least 30 weight percent water in the cooling zone. In addition, the diluted mixture may be diluted any number of times until the desired dilution level is achieved. In some embodiments, the dispersion is further cooled after exiting the extruder by the use of a suitable heat exchanger. In other embodiments, water is not added into the twin screw extruder but rather to a stream containing the resin melt after the melt has exited from the extruder. In this manner, steam pressure build-up in the extruder is eliminated and the dispersion is formed in a secondary mixing device such as a rotor stator mixer.

In another embodiment, the aqueous dispersion can be formed in a continuous high shear mixer without the use of a melt kneading extruder. In this embodiment, the first stream comprising one or more liquid or molten first polyesters is supplied to a continuous high shear mixer from a suitable liquid pump for example, a syringe pump, gear pump, or progressive cavity pump. The first stream is flowed through a first conduit and merged continuously with a second stream containing a continuous aqueous phase that is flowed through a second conduit. The first and second streams are merged into a disperser in the presence of a stabilizing agent comprising a second polyester with optional neutralizing agent. The agents can be added to either the first or second stream, or as a separate stream. A third stream comprising water can be added downstream from the disperser. The flow rates of the streams are adjusted to achieve a dispersion having the desired amount of polymer phase and percent solids. The disperser can be any one of a number of continuous inline mixers, for example, an IKA high-shear mixer, Oakes rotor stator mixer, Ross mixer, Silverson mixer, or centrifugal pump. The rpm setting of the disperser can be used to help control the particle size of the dispersed hydrophobic phase in the dispersion. The system can be heated to provide the polymer and neutralizer components at a suitable viscosity for pumping. Steam formation is reduced by controlling the pressure through the use of a backpressure regulator, gear pump, metering pump, or other suitable device near the exit of the process. In some embodiments, the dispersion is further cooled after exiting the disperser by the use of a suitable heat exchanger.

In another embodiment, the aqueous dispersion can be formed in a batch or semi-batch high shear mixer where the mixer may, for example, be disposed within a pressurized tank to, for example, reduce steam formation. All or at least a portion of the dispersion is removed from the tank during processing, and optionally cooled by the use of a suitable heat exchanger.

During the preparation of the aqueous dispersion, optionally one or more fillers; optionally one or more additives such as catalysts, wetting agents, defoamers, flow agents, release agents, slip agents, anti-blocking agents, additives to mask sulfur staining, pigment wetting/dispersion agents, anti-settling agents, UV stabilizers, adhesion promoters; optionally one or more lubricants such as fatty acid ester wax, silicon-based wax, fluorine-based wax, polyethylene or any other similar polyolefin wax, carnauba wax, lanolin wax or the like; optionally one or more corrosion inhibitors such as aluminum, and zinc: optionally one or more pigments, e.g. titanium dioxide, mica, calcium carbonate, barium sulfate, silica, zinc oxide, milled glass, aluminum trihydrate, talc, antimony trioxide, fly ash, and clay or the like; optionally one or more dyes; optionally one or more co-solvents, e.g. glycols, glycol ether, 2,2,4-trimethyl-1,3-pentanediol monoisobutyrate, alcohols, mineral spirits, and benzoate esters or the like; optionally one or more dispersants, e.g. aminoalcohols, and polycarboxylates; optionally one or more surfactants; optionally one or more defoamers; optionally one or more preservatives, e.g. biocides, mildewcides, fungicides, algaecides, and combinations thereof; optionally one or more thickeners, e.g. cellulosic based thickeners such as hydroxyethyl cellulose, hydrophobically modified alkali soluble emulsions (HASE thickeners such as UCAR POLYPHOBE TR-116) and hydrophobically modified ethoxylated urethane thickeners (HEUR); or optionally one or more additional neutralizing agents, e.g. hydroxides, amines, ammonia, and carbonates may be added to the aqueous dispersion formulation; or in the alternative, may be added to the dispersion post dispersion formulation process.

During the preparation of the aqueous dispersion, one or more crosslinking agents may also be added to the aqueous dispersion formulation; or in the alternative, may be added to the dispersion post dispersion formulation process.

Optionally during the dispersion of the one or more first polyesters, another polymer dispersion or emulsion may be used as a portion of the aqueous phase of the dispersion. Examples include, but are not limited to, acrylic, epoxy, polyester, polyurethane, polyolefin, polyamide, alkyd, and the like containing dispersions, emulsions, suspensions, colloidal suspensions.

In one embodiment, the method for producing the inventive aqueous dispersion comprises the steps of: (1) selecting one or more first polyesters having an acid number in the range of from less than 15, for example less than 10, or in the alternative less than 5; (2) selecting one or more stabilizing agents comprising at least one second polyester having an acid number equal to or greater than 15, for example greater than 20; (3) selecting one or more neutralizing agents; (4) melt-blending said one or more first polyesters, one or more stabilizing agents in the presence of water and one or more neutralizing agents; (4) thereby producing an aqueous dispersion having a solid content of 10 to 74 percent, based on the total weight of the dispersion.

Coating Applications and Forming Coated Containers or Closure Devices

The aqueous dispersion and/or coating composition derived therefrom may be used on any suitable substrate including, but not limited to metal, wood, paper, plastic, leather, glass, concrete, and the like. In one embodiment the aqueous dispersion and/or coating derived therefrom may be used, for example, in container, e.g. can, coating application, or closure device coating application. Such coated container devices include, but are not limited to, cans such as beverage cans, food cans; aerosol containers such as those for non-food products, e.g. hair spray, hair dye, or color spray lacquers; drums; kegs; pails; decorative tins; open trays; tubes, bottles, monoblocs, and the like. The coated articles such as closure devices include, but are not limited to, caps, lids such as thin aluminum foil based lids for yogurt and butter containers, or crown corks; closures for glass jars and bottles such as roll-on closures, vacuum closures, pilfer-proof closures, easy peel lids for can closures, and easy open end or conventional ends for cans. Cans may be 2 piece cans or 3 piece cans. Beverage cans include, but are not limited to, beer cans, carbonated soft drink cans, energy drink cans, isotonic drink cans, water cans, juice cans, tea cans, coffee cans, milk cans, and the like. Food cans, include, but are not limited to, vegetable cans, fruit cans, meat cans, soup cans, ready meal cans, fish cans, edible oil cans, sauce cans and the like. Such cans may have any shapes; for example, such can may have a cylindrical shape, cubical, spherical, semi-spherical, bottle shape, elongated cubical shape, shallow or tall shape, round or rectangular shape or any other suitable shape. The coated articles such as container devices according to the instant invention may be formed via any conventional method. For example, the coated container device may be formed via stamping, drawing, redrawing, wall ironing, bending, beading, embossing, debossing, flanging, necking, stretching, blow-stretching and any other suitable conventional method. Such methods are generally known to those having ordinary skill in the art. The aqueous dispersion and/or coating composition derived therefrom may, for example, be applied to a substrate, e.g. metal sheet or metal foil, and then the coated substrate may be formed into a coated container device or a coated closure device. In the alternative, a substrate may be formed into a container device or a closure device, and then the container device or the closure device is coated with one or more aqueous dispersions and/or coating composition derived therefrom to form the coated container device or coated closure device. The coating may be applied via any method; for example, via roller coating, spray coating, powder coating, dip coating, electrodeposition coating, printing, wash coating, flow coating, curtain coating.

The substrate comprises one or more metals including, but not limited to, aluminum and aluminum alloys, electrolytic tinplate cold rolled low carbon mild steel ("ETP"), electrolytic chromium/chromium oxide coated cold rolled low carbon mild steel (ECCS), and any other pre-treated steel, or one or more polymers such as one or more polyolefins, e.g. polyethylene and/or polypropylene. Pretreatment may include, but is not limited to, treatment with phosphoric acid, zirconium phosphate, chromium phosphate, and the like as well as silanes for reasons such as primary corrosion protection and improved adhesion. The substrate may comprise a sheet, strip or a coil. The substrate may comprise one or more layers, and each layer may have a thickness in the range of from 0.01 µm to 2 mm; for example, from 0.01 µm to 1.5 mm; or in the alternative, from 0.01 µm to 1 mm; or in the alternative, from 0.01 µm to 0.5 mm; or in the alternative, from 0.01 µm to 0.2 mm; or in the alternative, from 0.01 µm to 0.1 mm or in the alternative, from 0.01 µm to 100 µm; or in the alternative, from 0.01 µm to 50 µm; or in the alternative, from 1 µm to 50 µm; or in the alternative, from 1 µm to 15 µm. The substrate may be pre-coated with one or more pre-coating compositions. Such pre-coating compositions may optionally further include, but are not limited to, one or more resin binders, one or more resin crosslinkers, one or more solvents, one or more additives, and one or more pigments. Exemplary resin binders include, but are not limited to, epoxy, polyester, polyvinyl chloride containing organosols/vinyls, phenolic, alkyd, oleo-resin, acrylic resin, and the like. Exemplary crosslinkers include, but are not limited to, phenol-formaldehyde resins; amino-formaldehyde resins including but not limited to urea-formaldehyde, melamine formaldehyde, benzoguanamine formaldehyde, anhydride resins, blocked isocyanate resins and epoxy groups containing resins, including but not limited to, epoxy resins, epoxy groups containing polyesters, acrylic resins, vinyl resins or the like. Exemplary solvents and thinners include, but are not limited to, glycol ethers, alcohols, aromatics, e.g. aromatic hydrocarbons, white spirit, branched ketones and esters. Exemplary additives include, but are not limited to, catalysts, lubricants, wetting agents, defoamers, flow agents, release agents, slip agents, anti-blocking agents, additives to mask sulfur staining, pigment wetting/dispersion agents, anti-settling agents, UV stabilizers, adhesion promoters. Pigments include, but are not limited to titanium dioxide, zinc oxide, aluminum oxide, zinc and aluminum. The substrate may also be pre-coated with one or more pre-coated laminate compositions. Such compositions may, for example, include polyethylene, polypropylene, or polyester compositions, and may be applied either as a film via film lamination process or melt-extrusion coating process onto the metal surface.

The one or more aqueous dispersions and/or coating composition derived therefrom applied to the at least one surface of the substrate may be dried via any conventional drying method. Such conventional drying methods include but, are not limited to, air drying, convection oven drying, hot air drying, and/or infrared oven drying. During the drying process, crosslinking of one or more base polymers, stabilizing agents, or combinations thereof, involving one or more the crosslinking agents, may occur. Additional cure might occur by radiation cure, e.g. electron-beam cure. The one or more aqueous dispersions and/or coating composition derived therefrom applied to the at least one surface of the substrate may be dried at any temperature; for example, it may be dried at a temperature in the range of equal or greater than the melting point temperature of the first polyester; or in the alternative, it may be dried at a temperature in the range of less than the melting point of the stabilizing agent comprising a second polyester. The one or more aqueous dispersions and/or coating composition derived therefrom applied to the at least one surface of the substrate may be dried at a temperature in the range of about 60° F. (15.5° C.) to about 700° F. (371° C.) for a period of less than about 40 minutes, for example, less than 20 minutes, or less than 10 minutes, or less than 5 minutes, or less than 2 minutes, or less than 1 minute, or less than 20 seconds. All individual values and subranges from about 60° F. (15.5° C.) to about 700° F. (371° C.) are included herein and disclosed herein; for example, the one or more aqueous dispersions and/or coating composition derived therefrom applied to the at least one surface of the substrate may be dried at a temperature in the range of about 60° F. (15.5° C.) to about 500° F. (260° C.) for a period of less than about 40 minutes, for example, less than 20 minutes, or less than 10 minutes, or less than 5 minutes, or less than 2 minutes, or less than 1 minute, or in the alternative, the one or more aqueous dispersions and/or coating composition derived therefrom applied to the at least one surface of the substrate may be dried at a temperature in the range of about 60° F. (15.5° C.) to about 450° F. (232.2° C.) for a period of less than about 40 minutes, for example, less than 20 minutes, or less than 10 minutes, or less than 5 minutes, or less than 2 minutes, or less than 1 minute. The temperature of the one or more aqueous dispersions and/or coating composition derived therefrom applied to the at least one surface of the substrate may be raised to a temperature in the range of equal or greater than the melting point temperature of the base polymer for a period of less than about 40 minutes. All individual values and subranges from less than about 40 minutes are included herein and disclosed herein; for example, the temperature of the one or more aqueous dispersions and/or coating composition derived therefrom applied to the at least one surface of the substrate may be raised to a temperature in the range of equal or greater than the melting point temperature of the first polyester for a period of less than about 20 minutes, or in the alternative, the temperature of the one or more aqueous dispersions applied and/or coating composition derived therefrom to the at least one surface of the substrate may be raised to a temperature in the range of equal or greater than the melting point temperature of the first polyester for a period of less than about 5 minutes, or in another alternative, the temperature of the one or more aqueous dispersions and/or coating composition derived therefrom applied to the at least one surface of the substrate may be raised to a temperature in the range of equal or greater than the melting point temperature of the first polyester for a period in the range of about 0.5 to 300 seconds. In another alternative, the temperature of the one or more aqueous dispersions and/or coating composition derived therefrom applied to the at least one surface of the substrate may be raised to a temperature in the range of less than the melting point temperature of the first polyester for a period of less than 40 minutes. All individual values and subranges from less than about 40 minutes are included herein and disclosed herein; for example, the temperature of the one or more aqueous dispersions and/or coating composition derived therefrom applied to the at least one surface of the substrate may be raised to a temperature in the range of less than the melting point temperature of the first polyester for a period of less than about 20 minutes, or in the alternative, the temperature of the one or more aqueous dispersions and/or coating composition derived therefrom applied to the at least one surface of the substrate may be raised to a temperature in the range of less than the melting point temperature of the first polyester for a period of less than about 5 minutes, or in another alternative, the temperature of the one or more aqueous dispersions applied and/or coating composition derived therefrom to the at least one surface of the substrate may be raised to a temperature in the range of less than the melting point temperature of the first polyester for a period in the range of about 0.5 to 300 seconds.

The coated substrate may further be coated with one or more conventional coating compositions, or it may further be laminated to one or more other layers. Such conventional coating compositions are generally known to person of ordinary skill in the art, and they may include, but are not limited to, epoxy resin coating compositions, acrylate based coating compositions, and polyester based coating compositions. The lamination process is generally known, and exemplary lamination layers may include, but are not limited to, polyester laminates, polyolefin based laminates such as polypropylene laminates.

The one or more aqueous dispersions and/or coating composition derived therefrom applied to at least one surface of a substrate, for example a pre-coated substrate, as one or more crosslinked coating layers may have a cross cut adhesion, before retort, rating of at least 3B; for example, 4 B or 5B, measured according to ASTM-D 3359-08. The one or more aqueous dispersions and/or coating composition derived therefrom applied to at least one surface of a substrate as one or more crosslinked coating layers may have a wedge bend pass rating of at least 50 percent, for example, at least 70 percent, or in the alternative, at least 80 percent, or in the alternative, at least 90 percent, measured via a Gardner "COVERALL" Bend Tester IG 1125.

EXAMPLES

The following examples illustrate the present invention but are not intended to limit the scope of the invention. The examples of the instant invention demonstrate that the one or more aqueous dispersions applied to at least one surface of a metal substrate provide for improved coating layer flexibility as well as coating layer adhesion to the metal substrate.

Description of Formulation Components

Dynapol L952 is a saturated linear aromatic polyester having a $T_g$ of approximately 70° C., a molecular weight of 18000 g/mol, an acid number of 2 mg KOH/g, and a hydroxyl number of 6 mg KOH/g, available from Evonik Industries.

Dynapol L912 is a saturated linear aromatic polyester having a $T_g$ of approximately 105° C., acid number <3 mg KOH/g, OH number ~5 mg/g KOH/g, and a molecular weight of 15000 g/mol, available from Evonik Industries.

Dynapol LS615 is an aliphatic polyester having a $T_g$ of approximately −50° C., a molecular weight of 4000 g/mol, an acid number of <2 mg KOH/g, and a hydroxyl number of 26 mg KOH/g, available from Evonik Industries.

Crylcoat 1510 is an aromatic polyester having a $T_g$ of approximately 58° C., a melt viscosity of 8500 Poise at 200 C, an acid number of 71 mg KOH/g, and a hydroxyl number of <2 mg KOH/g, available from Cytec.

Finetone T382ES is a bisphenol-A fumarate (aromatic, linear) polyester with an acid number of 21 mg KOH/g, a $T_g$ of approximately 56° C., available from Reichhold.

Tego Addbond 1270 is a polyester with an acid number of 60 mg KOH/g and a hydroxyl number of 10 mg KOH/g, available from Evonik Tego Chemie GmbH.

Primacor 5980i (CAS No. 9010-77-9) is an ethylene acrylic-acid copolymer having acrylic acid content of approximately in the range of 19.5 to 21.5 weight percent, and a melt index of approximately 300 g/10 minutes (ASTM D 1238, 190° C./2.16 Kg), available from The Dow Chemical Company.

CYMEL 303 crosslinking agent is a commercial grade of hexamethoxymethylmelamine supplied in liquid form at >98% non-volatile. It is a clear viscous liquid with a viscosity of 2600-5000 centipoise, available from CYTEC.

NACURE 5925 is an amine neutralized DDBSA catalyst, uses as heat initiated catalyst catalyzing the crosslinking between the polyester and the crosslinker. It is a clear, light amber liquid supplied as 25% active. The recommended use level is 0.5 to 2.0% as supplied on total resin solids, available from King industries.

Preparation of Inventive Aqueous Dispersions A, B, & C, and Comparative Dispersion F Inventive aqueous dispersion examples A, B, & C and Comparative dispersion example F were prepared according to the following procedures based on the formulation components listed in Tables 1 and 2. The first polyester, and stabilizing agent were fed into a 25 mm diameter twin screw extruder by means of separate controlled rate feeders. In the extruder the first polyester and stabilizing agent were melted, mixed and forwarded. The extruder temperature profile was initially set to 150° C. prior to the addition of the initial water and neutralizing agent. After the addition of initial water and neutralizing agent the temperature was lowered to 120° C. across the barrel. In these examples DMEA, 2-dimethyl amino ethanol (100%) (CAS No. 108-01-0) was used as the neutralizing agent. The extruder speed was approximately 450 rpm. Amine base and initial water were mixed together and fed to the extruder at the initial water introduction point. The dilution water was fed via a second pump, and it was introduced into the dilution zone of the extruder. The initial water and dilution water streams were optionally pre-heated to the extruder temperature. At the extruder outlet, a back-pressure regulator was used to adjust to a suitable pressure inside the extruder barrel to prevent steam formation at the operating temperature. The resulting dispersions were cooled and filtered through a 200 micron filter. Inventive aqueous dispersion examples A, B, & C, and comparative dispersion example F were tested for their properties, and the results are reported in Table 3.

Preparation of Inventive Aqueous Dispersion Example D

Inventive aqueous dispersion example D was prepared according to the following procedures based on the formulation components listed in Table 1 and 2. The first polyester and stabilizing agent were fed into a 25 mm diameter twin screw extruder by means of separate controlled rate feeders. The Tego Addbond 1270 was devolatilized to remove the sec-butanol solvent from its commercially available form, and was cryogenically ground into 100% active chunks, which were supplied into the extruder by the controlled rate feeder. In the extruder the first polyester and stabilizing agent were melted, mixed and forwarded. The extruder temperature profile was initially set to 150° C. prior to the addition of the initial water and neutralizing agent. After the addition of initial water and neutralizing agent the temperature was lowered to 120° C. across the barrel. In this example DMEA, 2-dimethyl amino ethanol (100%) (CAS No. 108-01-0) was used as the neutralizing agent. The extruder speed was approximately 450 rpm. Amine base and initial water were mixed together and fed to the extruder at the initial water introduction point. The dilution water was fed via a second pump, and it was introduced into the dilution zone of the extruder. The initial water and dilution water streams were optionally pre-heated to the extruder temperature. At the extruder outlet, a back-pressure regulator was used to adjust to a suitable pressure inside the extruder barrel to prevent steam formation at the operating temperature. The resulting dispersion was cooled and filtered through a 200 micron filter. Inventive aqueous dispersion example D was tested for its properties, and the results are reported in Table 3.

Preparation of Comparative Dispersion Example E

Comparative dispersion example E was prepared according to the following procedures based on the formulation components listed in Table 1 and 2. The liquid first polyester, and the melted stabilizing agent were combined and fed into a 4 inch diameter rotor stator mixer (manufactured by E. T. Oakes Corporation) by means of a controlled rate feeder. In the mixer, the first polyester and stabilizing agent were combined with initial water and neutralizing agent. In this example DMEA, 2-dimethyl amino ethanol (100%) (CAS No. 108-01-0) was used as the neutralizing agent. The first polyester/stabilizing agent feed and the Oakes mixer were both temperature controlled to a set point of 150° C. After the addition of the initial water and neutralizing agent, the process lines were temperature controlled to a set point of 100° C. The mixer speed was set to 750 rpm for this example. The dilution water was fed via a second pump, and it was introduced to the process in a second Oakes mixer. The initial water and dilution water streams were optionally pre-heated to the line temperature at the point of delivery to the process. At the process outlet, a back-pressure regulator was used to adjust to a suitable pressure inside the process to prevent steam formation at the operating temperature. The resulting dispersion was cooled and filtered through a 200 micron filter. Comparative aqueous dispersion example E was tested for its properties, and the results are reported in Table 3.

TABLE 1

| Aqueous Dispersion | First Polyester (g/min) | Stabilizing Agent Comprising Second Polyester (g/min) | Avg. Polymer Phase Acid Number | Neutralizing Agent (ml/min) | Initial Water Rate (ml/min) | Dilution Water Rate (ml/min) | Average Particle Size Diameter (microns) |
|---|---|---|---|---|---|---|---|
| Inventive Example A | Dynapol L952 (60.5) | Crylcoat 1510 (15.1) | 15.8 | DMEA (2.6) | 11.6 | 65 | 0.5 |
| Inventive Example B | Dynapol L952 (55.1) | Finetone T382ES (13.8) | 5.8 | DMEA (1.5) | 9.1 | 67 | 1.1 |
| Inventive Example C | Dynapol L912 (60.5) | Crylcoat 1510 (15.1) | 16.6 | DMEA (3.41) | 9.71 | 75 | 1.4 |
| Inventive Example D | Dynapol L952 (48.4) | Tego Addbond 1270 (12.1) | 13.6 | DMEA (2.5) | 11.8 | 75 | 1.2 |
| Comparative Example E | Dynapol LS615 (45.0) | Crylcoat 1510 (5.0) | 8.9 | DMEA (1.11) | 15 | 30 | 6.8 |
| Comparative Example F | Dynapol L952 (60.5) | Primacor 5980i (15.1) | 32.6 | DMEA (5.5) | 17.7 | 70 | No dispersion |

TABLE 2

| Aqueous Dispersion | First Polyester (w %) | Stabilizing Agent Comprising Second Polyester (w %) | Neutralizing Agent (w %) | Water (w %) |
|---|---|---|---|---|
| Inventive Example A | 39.1 | 9.8 | 1.7 | 49.4 |
| Inventive Example B | 37.6 | 9.4 | 1.0 | 52.0 |
| Inventive Example C | 37.0 | 9.2 | 2.1 | 51.7 |
| Inventive Example D | 32.3 | 8.1 | 1.7 | 57.9 |
| Comparative Example E | 46.8 | 5.2 | 1.2 | 46.8 |
| Comparative Example F | 35.8 | 8.9 | 3.3 | 52.0 |

TABLE 3

| Aqueous Dispersion | Total % solids | % Neutralization | pH | Average Particle Size Diameter (microns) |
|---|---|---|---|---|
| Inventive Example A | 49.42% | 120% | 8.12 | 0.5 |
| Inventive Example B | 49.82% | 210% | 8.82 | 1.1 |
| Inventive Example C | 49.08% | 120% | 9.12 | 1.4 |
| Inventive Example D | 46.52% | 150% | 9.54 | 1.2 |
| Comparative Example E | Not measured | 130% | Not measured | 6.8 |
| Comparative Example F | No dispersion | 120% | No dispersion | No dispersion |

Melt blends of the first and second polyesters were prepared in order to assess their compatibility and suitability for preparing a stable dispersion with particle size of less than 5 micron as described below.

Preparation of Melt Blends of First and Second Polyesters Examples H, I, & J, and Comparative Example L Inventive melt blend examples H, I, & J, and comparative blend examples L were prepared according to the following procedures based on the formulation components listed in Table 4. The first polyester, and stabilizing agent were fed into a 25 mm diameter twin screw extruder by means of separate controlled rate feeders. In the extruder the first polyester and stabilizing agent were melted, mixed and forwarded. The extruder temperature profile was set to 150° C. Inventive melt blend examples H, I, & J, and comparative melt blend example L were collected at the extruder outlet, and tested for their properties. The results are reported in table 4.

Preparation of Comparative Melt Blend of Polyester Example K

Comparative dispersion example K was prepared according to the following procedure. The Crylcoat 1510 stabilizing agent was fed into a 25 mm diameter twin screw extruder by means of a controlled rate feeder at a rate of 10 g/min. First polyester, Dynapol LS615, was supplied as a liquid to the melt zone of the extruder at a rate of 30 g/min where it was mixed and forwarded with the stabilizing agent. The extruder temperature profile was initially set to 130° C. and reduced to 80 C after all the flows were initialized. The comparative melt blend example K was collected at the extruder outlet, and tested for its properties. The results are reported in table 4.

As shown in Table 4, inventive blends H, I, and J, resulted in a semi-clear/amber melt blend, while the comparative examples K & L resulted in opaque, dull, or hazy white blends, indicating poor compatibility between the first and second polyesters. When dispersions were subsequently produced from inventive blends H, I, and J, excellent stable dispersions with small particle size were produced, while no stable dispersion could be produced from comparative example blend L, and comparative example blend K produced a very poor dispersion with large particle size.

TABLE 4

| Melt Blend | First Polyester | Stabilizing Agent | Resultant Dispersion Avg. Particle Size (microns) | Melt Blend Appearance |
|---|---|---|---|---|
| Inventive Example H | Dynapol L952 | Crylcoat 1510 | 0.5 | Semi-clear amber |
| Inventive Example I | Dynapol L952 | Finetone T382ES | 1.1 | Semi-clear amber |
| Inventive Example J | Dynapol L912 | Crylcoat 1510 | 1.4 | Semi-clear amber |
| Comparative Example K | Dyapol LS615 | Crylcoat 1510 | 6.8 | Opaque dull white |
| Comparative Example L | Dynapol L952 | Primacor 5980 | No dispersion | Opaque bright white |

Preparation of Inventive Coating Compositions 1-10

Inventive Aqueous dispersion Examples A, B, C, and D were mixed with Cymel™ 303LF, hexamethoxymethylmelamine resin (Cytec Industries), as a crosslinking agent, Nacure 5925, amine neutralized dodecylbenzene sulfonic acid (King Industries), as a catalyst, and additional water to reduce solids in a 2 oz. glass jar using a tumbler at room temperature, approximately 25° C., overnight (18-24 hrs) to yield the inventive coating compositions 1-10. Coatings formulations for inventive coating compositions 1-10 are listed in Table 5.

TABLE 5

| Inventive Coating Composition | Inventive Dispersion Example | Dispersion Amount (g) | Cymel 303LF Amount (g) | Nacure 5925 Amount (g) | Water Amount (g) | Total Formulation Amount (g) | Total Formulation % Solids |
|---|---|---|---|---|---|---|---|
| 1 | A | 40.00 | 2.30 | 0.12 | 0.00 | 42.42 | 54.57 |
| 2 | A | 40.00 | 5.18 | 0.13 | 2.41 | 47.72 | 54.57 |
| 3 | A | 40.00 | 8.88 | 0.15 | 5.51 | 54.54 | 54.57 |
| 4 | A | 40.00 | 13.82 | 0.17 | 9.64 | 63.63 | 54.57 |
| 5 | B | 40.00 | 1.05 | 0.10 | 0.00 | 41.15 | 51.23 |
| 6 | C | 40.00 | 1.03 | 0.10 | 0.00 | 41.13 | 50.49 |
| 7 | C | 40.00 | 2.18 | 0.11 | 0.00 | 42.29 | 51.84 |
| 8 | D | 40.00 | 7.97 | 0.13 | 0.00 | 48.10 | 55.53 |
| 9 | D | 20.00 | 0.49 | 0.05 | 0.00 | 20.54 | 47.92 |
| 10 | D | 20.00 | 1.04 | 0.05 | 0.00 | 21.09 | 49.27 |

Preparation of Comparative Coating Compositions 11 and 12

Dynapol L952 was dissolved into a 1:1 blend by weight of toluene and PM acetate (1-methoxy-2-acetoxypropane) at 70° C. to produce a 40% weight solids solution. This procedure was performed in 5 liter round bottom flask, equipped with reflux condenser, under constant agitation with a rod stirrer and a heating mantle, resulting in ~3500 g of solution. After cooling to room temperature (~25° C.), this solution was then mixed with Cymel™ 303LF, hexamethoxymethylmelamine resin (Cytec Industries), as a crosslinking agent, Nacure 5925, amine neutralized dodecylbenzene sulfonic acid (King Industries), as a catalyst, and PM acetate to reduce solids in a 2 oz. glass jar using a tumbler at room temperature, approximately 25° C., overnight (18-24 hrs) to yield comparative coating compositions 11. Dynapol L952 solvent based solution was mixed with Cymel™ 303LF, Crylcoat 1510-0, DMEA, for amine neutralization, Nacure 5925, and PM acetate to reduce solids in a 2 oz. glass jar using a tumbler at room temperature, approximately 25° C., overnight (18-24 hrs) to yield comparative coating compositions 12. Coating formulations for comparative coating compositions 11 and 12 are listed in Table 6.

TABLE 6

| Comparative Coating Composition | Dynapol L952 SB Solution Amount (g) | Crylcoat 1510-0 Amount (g) | Cymel 303LF Amount (g) | DMEA Amount (g) | Nacure 5925 Amount (g) | Extra PMA Amount (g) | Total Formulation Amount (g) | Total Formulation % Solids |
|---|---|---|---|---|---|---|---|---|
| 11 | 25.00 | 0.00 | 4.29 | 0.00 | 0.07 | 18.50 | 47.86 | 30.00 |
| 12 | 25.00 | 2.50 | 4.29 | 0.28 | 0.09 | 25.74 | 57.90 | 29.64 |

Coating Application

A tin plate panel, provided by Rasselstein, having grade TS-245 standard finish, with approximately 10 cm to 20 cm size was cleaned with acetone, and then dried. About 3 grams of the various coating compositions were applied individually to the tin plate panel via a 35 micron (1.4 mil #14) wirewound drawdown bar thereby coating one surface of the tin plate panel. Subsequently, the panel was placed into a convection oven to be cured for 10 minutes at 200° C. The coated tin plate panels were tested for wedge bend, cross cut adhesion before sterilization, and cross cut adhesion and blush after sterilization according to the procedures described below. Aluminum panels (can stock clean aluminum measuring 0.009×4"×12" from All Foils), cleaned with acetone and dried, were used for coating thickness and MEK DR (methyl ethyl ketone double rub) evaluation. The results are reported in Table 7 and 8.

TABLE 7

| Coating Composition | Coating Thickness (mil) | MEK Double Rubs | Wedge Bend (% Pass) | Crosscut Adhesion Before Retort in Water | Crosscut Adhesion After Retort in Water | Retort Resistance in Water |
|---|---|---|---|---|---|---|
| 1 | 0.35-0.45 | 150+ | 100 | 5B | 5B | 3 |
| 2 | 0.35-0.45 | 150+ | 94 | 5B | 5B | 3 |
| 3 | 0.35-0.45 | 150+ | 88 | 5B | 1B | 3 |
| 4 | 0.35-0.45 | 150+ | 77 | 5B | 5B | 3 |
| 5 | 0.20-0.35 | 25 | 86 | 5B | 0B | 4 |
| 6 | 0.24-0.30 | 40 | 68 | 5B | 5B | 3 |
| 7 | 0.24-0.30 | 150+ | 100 | 5B | 5B | 3 |
| 8 | 0.36-0.44 | 150+ | 90 | 5B | 0B | 2 |
| 9 | 0.35-0.45 | 25 | 90 | 5B | 0B | 4 |
| 10 | 0.30-0.40 | 150+ | 73 | 5B | 0B | 3 |
| 13 | 0.35-0.45 | 65 | 84 | 5B | 5B | 5 |
| 14 | 0.35-0.45 | 60 | 76 | 5B | 5B | 4 |

TABLE 8

| Coating Composition | Crosscut Adhesion Before Retort in Lactic Acid | Crosscut Adhesion After Retort in Lactic Acid | Retort Resistance in Lactic Acid |
|---|---|---|---|
| 1 | 5B | 5B | 3 |
| 2 | 5B | 5B | 3 |
| 3 | 5B | 3B | 3 |
| 4 | 5B | 0B | 3 |
| 5 | 5B | 2B | 3 |
| 6 | 5B | 5B | 3 |
| 7 | 5B | 5B | 3 |
| 8 | 5B | 0B | 4 |
| 9 | 5B | 0B | 4 |
| 10 | 5B | 0B | 4 |
| 13 | 5B | 0B | 4 |
| 14 | 5B | 2B | 4 |

Test Methods

Test methods include the following:
Particle Size Measurement

The average particle size was measured by a Coulter LS-230 particle size analyzer (Beckman Coulter Corporation).
Cross-Cut Adhesion Before Retort Cross-cut adhesion is measured according to ASTM-D 3359-02, measuring adhesion by tape test, Method B., using an Erichsen cross-cut tester EPT 675R. This method provides the procedure for assessing the adhesion of coating films to metallic substrates by applying and removing a tape (grade: TESA 4124 clear) over the cuts made in the film. Place the centre of a piece of tape over the grid and in the area of the grid smooth into place by a finger. To ensure good contact with the film rub the tape firmly. Within 90±30 seconds of application, remove the tape by seizing the free end and rapidly (not jerked) pulling it off at as close to an angle of 180 degrees as possible. Inspect the grid area for removal of coating from the substrate or from a previous coating using the illuminated magnifier. Rate the adhesion in accordance with the following scale rating:

5B The edges of the cuts are completely smooth; none of the squares of the lattice is detached.
4B Small flakes of the coating are detached at intersections; less than 5% of the area is affected.
3B Small flakes of the coating are detached along the edges and at intersections of cuts. The area affected is 5-15% of the lattice.
2B The coating has flaked along the edges and on parts of the squares. The area affected is 15-35% of the lattice.
1B The coating has flaked along the edges of cuts in large ribbons and whole squares have detached. The area affected is 35-65% of the lattice.
0B Flaking and detachment is worse than 1B Cross-Cut Adhesion after Retort In addition to testing cross cut adhesion on the dry panels prior to water retort exposure, a cross-cut adhesion test is performed within an hour of being removed from the autoclave and rated for adhesion as described in the cross cut adhesion section. The adhesion is rated in accordance with the following scale rating:

5B The edges of the cuts are completely smooth; none of the squares of the lattice is detached.
4B Small flakes of the coating are detached at intersections; less than 5% of the area is affected.
3B Small flakes of the coating are detached along the edges and at intersections of cuts. The area affected is 5-15% of the lattice.
2B The coating has flaked along the edges and on parts of the squares. The area affected is 15-35% of the lattice.
1B The coating has flaked along the edges of cuts in large ribbons and whole squares have detached. The area affected is 35-65% of the lattice.
0B Flaking and detachment is worse than 1B Retort Resistance (Water)

The coated panels were immersed in water in individual pressurizable glass beakers that were contained in a secondary container tray, and placed into a Tuttnauer 10" dia×18" Deep Chamber Autoclave model 1 Z-TUT-EZ-10 where they were retorted at 129° C. for 30 minutes. The panels were removed, and dried. The coating appearance was then rated on a scale of 1-5 (5—best, 1—worst) as determined by blush (a whitish appearance of the coating), as shown below.

| | |
|---|---|
| 5 | No Blush |
| 4 | Very Slight blush |
| 3 | Slight blush |
| 2 | Blush |
| 1 | Strong Blush |

Retort Resistance (Lactic Acid)

The coated panels were immersed in 2% lactic acid in individual pressurizable glass beakers that were contained in a secondary container tray, and placed into a Tuttnauer 10" dia×18" Deep Chamber Autoclave model 1 Z-TUT-EZ-10 where they were retorted at 121° C. for 30 minutes. The panels were removed, and dried. The coating appearance was then rated on a scale of 1-5 (5—best, 1—worst) as determined by blush (a whitish appearance of the coating) as shown below.

| | |
|---|---|
| 5 | No Blush |
| 4 | Very Slight blush |
| 3 | Slight blush |
| 2 | Blush |
| 1 | Strong Blush |

MEK Double Rub

The round end of a 1.5 pound ball peen hammer was used to perform the MEK double rub test by applying a force of ~1000-2000 g to the coating. A 4"×4" square of cheesecloth was bound around the hammer end and soaked with methyl ethyl ketone (MEK). The hammer was brought into contact with the coating, and moved forth-and-back over a section measuring approximately 6"×1", wherein one movement forth-and-back over the whole coating is considered one double rub. Double rubs were performed at a rate of about one double rub per second. No additional pressure was applied onto the hammer. After every 25 double rubs, the tissue was re-soaked. The double rub step was repeated until the coating was rubbed off, i.e. at least a portion of the metal substrate was exposed (excluding the ½" end sections of the testing area). In the event that the double rub step reached 150 double rubs, the testing was terminated, and 150+ double rubs were reported as the final results.

Wedge Bend

Wedge bend was measured via Gardner "COVERALL" Bend Tester IG 1125. The apparatus used for this test consists of two parts to convert it to a bending machine. A steel rod (mandrel) is mounted at the front of the base. The coated test panel of 100 mm width was flexed over the 3 mm rod mandrel; thus, the coating appears on the outside of the bend. The flexed panel was inserted in the wedge mandrel. The impacter, i.e. a metal weight, was raised to 40 centimeters height, and then dropped. The impacter is retrieved on its first bounce, and secured. The cylindrical fold in the panel was squeezed into a conical shape. The edge of the coated panel was rubbed with a solution of copper sulfate (mixture of 10 grams of copper sulfate, 90 grams of water and 3 grams of sulfuric acid). Anywhere the coating had been cracked; dark spots appeared, indicating failure. The length of the intact area along the length of the wedge bend, which is 100 mm, was measured in millimeters and expressed as percent ok.

Coating Thickness

Coating thickness was measured according to ASTM-D 1186-93, non-destructive measurement of dry film thickness of non magnetic coatings applied to a non-ferrous base, using a Byko-Test 8500 coating thickness gauge. The standard aluminum panel without any coating was used for calibration. The thickness of the coating of the coated panels was reported as the range of 10 measurements, wherein each measurement of the thickness of the coating of the coated panels was measured using a probe for non-ferrous materials relative to the thickness of the coating of the standard panel, i.e. zero. The measured thickness was reported in mils.

The present invention may be embodied in other forms without departing from the spirit and the essential attributes thereof, and, accordingly, reference should be made to the appended claims, rather than to the foregoing specification, as indicating the scope of the invention.

We claim:
1. A coating comprising:
   at least one or more film layers derived from an aqueous dispersion comprising the melt blending product of:
   (a) from 50 to 99 percent by weight of one or more first polyesters, based on the total solid content of the dispersion, wherein said one or more first polyesters have an acid number in the range of from 2 to 3, based on the total solid content of the one or more first polyesters;
   (b) from 1 to 50 percent by weight of one or more stabilizing agents comprising at least one second polyester, based on the total solid content of the dispersion, wherein said second polyester has a carboxylic acid group and an acid number equal to or greater than 15, based on the solid content of the second polyester;
   (c) one or more neutralizing agents;
   (d) from 15 to 90 percent by weight of water, based on the total weight of the dispersion;
   (e) one or more crosslinking agents;
   wherein said dispersion has a solid content of 10 to 85 percent, based on the total weight of the dispersion, and wherein the volume average particle size of the dispersion is less than 5 microns; wherein said coating has a cross cut adhesion, before retort, rating of at least 3B, measured according to ASTM-D 3359-08, and a Wedge bend pass rating of at least 50 percent measured via a Gardner "COVERALL" Bend Tester 1G 1125.

2. The coating according to claim 1, wherein said first polyester has a glass transition temperature ($T_g$) of at least 30° C.

3. A can or coil coating composition the coating of claim 1.

4. A coated article comprising:
   one or more substrates;
   at least one or more coating layers derived from an aqueous dispersion comprising the melt blending product of:
   (a) from 50 to 99 percent by weight of one or more first polyesters, based on the total solid content of the dispersion, wherein said one or more first polyesters have an acid number in the range of from 2 to 3, based on the total solid content of the one or more first polyesters;
   (b) from 1 to 50 percent by weight of one or more stabilizing agents comprising at least one second polyester, based on the total solid content of the dispersion, wherein said second polyester has a carboxylic acid group and an acid number equal to or greater than 15, based on the solid content of the second polyester;
   (c) one or more neutralizing agents;
   (d) from 15 to 90 percent by weight of water, based on the total weight of the dispersion;
   (e) one or more crosslinking agents;
   wherein said dispersion has a solid content of 10 to 85 percent, based on the total weight of the dispersion, and wherein the volume average particle size of the dispersion is less than 5 microns; wherein said coating has a cross cut adhesion, before retort, rating of at least 3B, measured according to ASTM-D 3359-08, and a Wedge bend pass rating of at least 50 percent measured via a Gardner "COVERALL" Bend Tester 1G 1125.

5. A method for making a coated article comprising the steps of:
   selecting a substrate;
   selecting a coating composition comprising an aqueous dispersion comprising the melt blending product of:

(a) from 50 to 99 percent by weight of one or more first polyesters, based on the total solid content of the dispersion, wherein said one or more first polyesters have an acid number in the range of from 2 to 3, based on the total solid content of the one or more first polyesters;

(b) from 1 to 50 percent by weight of one or more stabilizing agents comprising at least one second polyester, based on the total solid content of the dispersion, wherein said second polyester has a carboxylic acid group and an acid number equal to or greater than 15, based on the solid content of the second polyester;

(c) one or more neutralizing agents;

(d) from 15 to 90 percent by weight of water, based on the total weight of the dispersion;

(e) one or more crosslinking agents;

wherein said dispersion has a solid content of 10 to 85 percent, based on the total weight of the dispersion, and wherein the volume average particle size of the dispersion is less than 5 microns;

applying said coating composition to at least one surface of said substrate;

removing at least a portion of the water from said the coating composition;

thereby forming one or more coating layers associated with said substrate; and thereby forming said coated substrate into a coated article wherein said coating has a cross cut adhesion, before retort, rating of at least 3B, measured according to ASTM-D 3359-08, and a Wedge bend pass rating of at least 50 percent measured via a Gardner "COVER-ALL" Bend Tester 1G 1125.

* * * * *